United States Patent
Liu et al.

(10) Patent No.: US 11,129,168 B2
(45) Date of Patent: *Sep. 21, 2021

(54) SYSTEM AND METHOD FOR RANDOM ACCESS IN HETEROGENEOUS COMMUNICATIONS SYSTEMS

(71) Applicant: Futurewei Technologies, Inc., Plano, TX (US)

(72) Inventors: Jialing Liu, Palatine, IL (US); Bingyu Qu, Schaumburg, IL (US); Weimin Xiao, Hoffman Estates, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,918

(22) Filed: Mar. 11, 2019

(65) Prior Publication Data
US 2019/0208526 A1 Jul. 4, 2019

Related U.S. Application Data

(63) Continuation of application No. 14/038,196, filed on Sep. 26, 2013, now Pat. No. 10,231,247.
(Continued)

(51) Int. Cl.
*H04W 72/08* (2009.01)
*H04W 74/00* (2009.01)
*H04L 5/00* (2006.01)

(52) U.S. Cl.
CPC ......... *H04W 72/082* (2013.01); *H04L 5/0057* (2013.01); *H04W 74/006* (2013.01);
(Continued)

(58) Field of Classification Search
CPC ............ H04W 72/082; H04W 74/006; H04W 74/008; H04L 5/0057; H04L 5/001; H04L 5/0051; H04L 5/005; H04L 5/0035
(Continued)

(56) References Cited

U.S. PATENT DOCUMENTS 9,712,298 B2 7/2017 Ko et al.
2008/0101305 A1 5/2008 Cave et al.
(Continued)

FOREIGN PATENT DOCUMENTS

CN 101772928 A 7/2010
CN 101945479 A 1/2011
(Continued)

OTHER PUBLICATIONS

XP050394125 R4-094633 Motorola ,"HeNB Interference Coordination: An Alternative to X2",3GPP TSG-RAN WG4 Meeting #53,Jeju, South Korea, Nov. 8-14, 2009,total 7 pages.
(Continued)

*Primary Examiner* — Faisal Choudhury
(74) *Attorney, Agent, or Firm* — David Roe

(57) ABSTRACT

A method for operating a user equipment includes receiving a set of first random access channel (RACH) parameters associated with a first group of identifiers, and wherein identifiers in the first group of identifiers are used for generating pseudo-random sequences, and performing a random access procedure in accordance with the set of first RACH parameters and the first group of identifiers.

11 Claims, 16 Drawing Sheets

Related U.S. Application Data

(60) Provisional application No. 61/705,987, filed on Sep. 26, 2012.

(52) U.S. Cl.
CPC .............. *H04L 5/001* (2013.01); *H04L 5/005* (2013.01); *H04L 5/0035* (2013.01); *H04L 5/0051* (2013.01); *H04W 74/008* (2013.01)

(58) Field of Classification Search
USPC ........................................................ 370/329
See application file for complete search history.

(56) References Cited

U.S. PATENT DOCUMENTS

| | | | |
|---|---|---|---|
| 2009/0034452 | A1 | 2/2009 | Somasundaram et al. |
| 2009/0109915 | A1* | 4/2009 | Pasad .................. H04L 5/003 370/329 |
| 2009/0238064 | A1 | 9/2009 | Lee et al. |
| 2010/0067498 | A1 | 3/2010 | Lee et al. |
| 2010/0182903 | A1 | 7/2010 | Palanki et al. |
| 2010/0302934 | A1 | 12/2010 | Baker et al. |
| 2011/0205980 | A1 | 8/2011 | Prakash et al. |
| 2011/0235597 | A1 | 9/2011 | Montojo et al. |
| 2011/0237267 | A1 | 9/2011 | Chen et al. |
| 2011/0274097 | A1 | 11/2011 | Zhang et al. |
| 2011/0305232 | A1 | 12/2011 | Singamsetty et al. |
| 2011/0310852 | A1 | 12/2011 | Dimou et al. |
| 2012/0076085 | A1 | 3/2012 | Chou |
| 2012/0140660 | A1 | 6/2012 | Kang et al. |
| 2012/0176885 | A1 | 7/2012 | Lee et al. |
| 2012/0178454 | A1 | 7/2012 | Kim et al. |
| 2012/0236741 | A1 | 9/2012 | Xu et al. |
| 2012/0327904 | A1 | 12/2012 | Park et al. |
| 2013/0044665 | A1* | 2/2013 | Ng .................... H04W 52/40 370/311 |
| 2013/0188577 | A1 | 7/2013 | Papasakellariou et al. |
| 2013/0235821 | A1 | 9/2013 | Chen et al. |
| 2013/0242951 | A1* | 9/2013 | Lee .................... H04W 56/0015 370/336 |
| 2013/0301439 | A1* | 11/2013 | Heo .................... H04W 56/001 370/252 |
| 2014/0022884 | A1 | 1/2014 | Bao et al. |
| 2014/0036747 | A1 | 2/2014 | Nory et al. |
| 2014/0059662 | A1 | 2/2014 | Zhu et al. |
| 2014/0112263 | A1 | 4/2014 | Lee et al. |
| 2014/0169260 | A1* | 6/2014 | Nishio .................. H04J 3/0635 370/312 |
| 2015/0071260 | A1 | 3/2015 | Chun et al. |
| 2015/0155993 | A1 | 6/2015 | Berggren et al. |
| 2017/0055295 | A1 | 2/2017 | Somasundaram et al. |

FOREIGN PATENT DOCUMENTS

| | | |
|---|---|---|
| CN | 102256280 A | 11/2011 |
| CN | 102548015 A | 7/2012 |
| CN | 102598537 A | 7/2012 |
| CN | 102598832 A | 7/2012 |
| CN | 102625461 A | 8/2012 |
| CN | 102685731 A | 9/2012 |
| CN | 103108405 A | 5/2013 |
| WO | 2012062196 A1 | 5/2012 |
| WO | 2012124552 A1 | 9/2012 |
| WO | 2013138389 A2 | 9/2013 |

OTHER PUBLICATIONS

XP050601221 R1-122994 Ad-hoc Session Chairman (Samsung),"Summary of UL COMP Ad-hoc Session",3GPP TSG RAN WG1 Meeting #69,Prague, Czech Republic, May 21 25, 2012,total 7 pages.

XP050649199 3GPP TS 36.211 V11.0.0 (Sep. 2012),3rd Generation Partnership Project;Technical Specification Group Radio Access Network;Evolved Universal Terrestrial Radio Access (E-UTRA);Physical Channels and Modulation (Release 11),total 106 pages.

XP050661084 R1-123192 Texas Instruments ,"On the Need for SRS Enhancements for CoMP",3GPP TSG RAN WG1 #70,Qingdao, China, Aug. 13 17, 2012,total 4 pages.

XP050581191 3GPP TS 36.304 V11.0.0 (Jun. 2012),"3rd Generation Partnership Project;Technical Specification Group Radio Access Network;Evolved Universal Terrestrial Radio Access (E-UTRA); User Equipment (UE) procedures in idle mode(Release 11)",total 33 pages.

XP050581185 3GPP TS 36.331 V11.0.0 (Jun. 2012),3rd Generation Partnership Project;Technical Specification Group Radio Access Network;Evolved Universal Terrestrial Radio Access (E-UTRA);Radio Resource Control (RRC);Protocol specification(Release 11),total 302 pages.

XP050649832 3GPP TS 36.321 V11.0.0 (Sep. 2012);3rd Generation Partnership Project;Technical Specification Group Radio Access Network;Evolved Universal Terrestrial Radio Access (E-UTRA);Medium Access Control (MAC) protocol specification(Release 11),total 55 pages.

"3rd Generation Partnership Project; Technical Specification Group Radio Access Network; Evolved Universal Terrestrial Radio Access (E-UTRA); Physical Channels and Modulation (Release 11)," 3GPP TS 36.211 V11.3.0, Technical Specification, Jun. 2013, 108 pages.

"3rd Generation Partnership Project; Technical Specification Group Radio Access Network; Evolved Universal Terrestrial Radio Access (E-UTRA); Physical layer procedures (Release 11)," 3GPP TS 36 213 V11.3.0, Technical Specification, Jun. 2013, 176 pages.

"3rd Generation Partnership Project; Technical Specification Group Radio Access Network; Evolved Universal Terrestrial Radio Access (E-UTRA); Medium Access Control (MAC) protocol specification (Release 11)," 3GPP TS 36.321 V11.3.0, Technical Specification, Jun. 2013, 57 pages.

Sangbum Kim et al:"Uplink Capacity Maximization based on Random Access Channel (RACH) Parameters in WCDMA",2006,total 5 pages.

Youbang Jiang:"Research on TDD-LTE Synchronization Technology and DSP Implementation",2011,total 92 pages.

3GPP TSG-RAN WG1 Meeting 64,R1-110770:"UE behaviour around CSI-RS",Panasonic,total 4 pages.

* cited by examiner

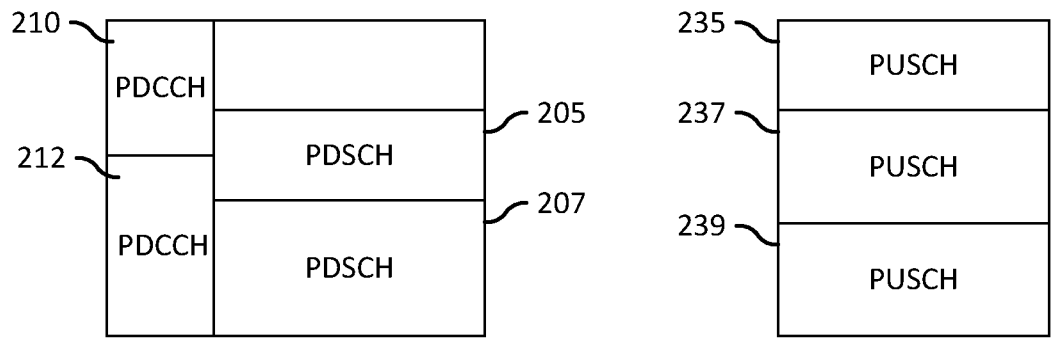
*Fig. 2a*  *Fig. 2b*
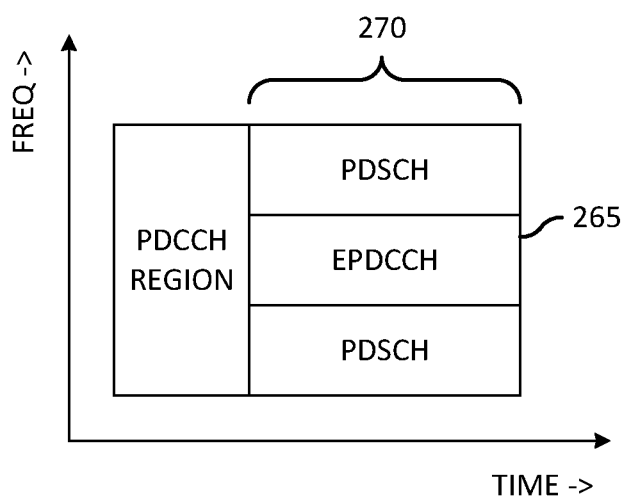
*Fig. 2c*

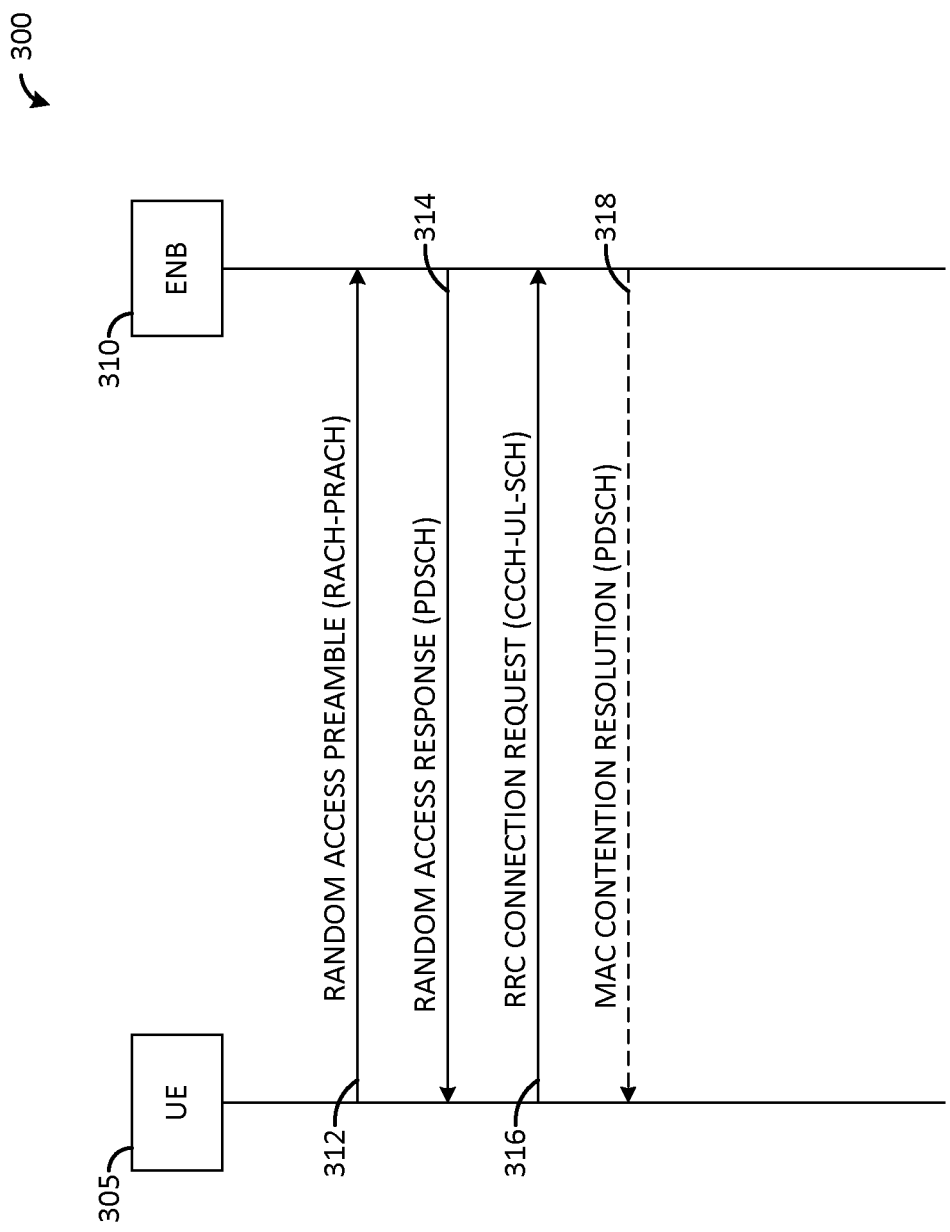

SYSTEM AND METHOD FOR RANDOM ACCESS IN HETEROGENEOUS COMMUNICATIONS SYSTEMS

This application is a continuation of U.S. patent application Ser. No. 14/038,196, filed on Sep. 26, 2013 by Liu, et al., which claims the benefit of U.S. Provisional Application No. 61/705,987, filed on Sep. 26, 2012 by Liu, et al., all of which are incorporated herein by reference as if reproduced in its entirety.

TECHNICAL FIELD

The present disclosure relates generally to digital communications, and more particularly to a system and method for random access in heterogeneous communications systems.

BACKGROUND

Wireless communication systems include Third Generation Partnership Project (3GPP) long term evolution (LTE), LTE-A, and LTE-A beyond systems. Typically, in a modern wireless communications system, there is a plurality of NodeBs (NBs) (also commonly referred to as base stations, communications controllers, or eNBs (enhanced NBs), and so on, and may even include network points using different radio access technologies (RATs) such as high speed packet access (HSPA) NBs and WiFi access points). A NodeB may be associated with a point or multiple points, and a cell may include a point or multiple points, with each point having a single or multiple antennas. A point may also correspond to multiple cells operating in multiple component carriers. The eNBs are interconnected with each other by means of an X2 interface. The eNBs are also connected by means of an S1 interface to a Mobility Management Entity (MME) and to a Serving Gateway (S-GW). Additionally, a cell or NB may be serving a number of users (also commonly referred to as User Equipment (UE), mobile stations, terminals, subscribers, users, and so forth) over a period of time.

SUMMARY OF THE DISCLOSURE

Example embodiments of the present disclosure which provide a system and method for random access in heterogeneous communications systems.

In accordance with an example embodiment of the present disclosure, a method for operating a user equipment (UE) is provided. The method includes receiving, by the UE, a set of random access channel (RACH) parameters associated with a first group of identifiers, and wherein identifiers in the first group of identifiers are used for generating pseudo-random sequences, and performing, by the UE, a random access procedure in accordance with the set of RACH parameters and the first group of identifiers.

In accordance with another example embodiment of the present disclosure, a method for participating in a random access procedure is provided. The method including receiving, by a communications controller, a random access channel (RACH) preamble in accordance with a set of RACH parameters associated with a group of identifiers used in the generation of pseudo-random sequences, the group of identifiers including an identifier of the communications controller, the RACH preamble received from a user equipment, and the RACH preamble initiating the random access procedure between the user equipment and the communications controller, and transmitting, by the communications controller, a RACH response (RAR) including a resource allocation for a transmission grant for the user equipment to transmit a message to the communications controller, the RAR transmitted in accordance with the set of RACH parameters.

In accordance with another example embodiment of the present disclosure, a user equipment (UE) is provided. The UE includes a receiver, and a processor operatively coupled to the receiver. The receiver receives a set of random access channel (RACH) parameters associated with a first group of identifiers, and wherein identifiers in the first group of identifiers are used for generating pseudo-random sequences. The processor performs a random access procedure in accordance with the set of RACH parameters and the first group of identifiers.

One advantage of an embodiment is that random access interference to eNBs and UEs is reduced since random access procedures may occur between devices that are more closely located and transmit power levels may be reduced.

A further advantage of an embodiment is that power consumption may be reduced to lower transmit power levels.

Yet another advantage of an embodiment is that network operation complexity and latency is reduced.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 2a illustrates an example a subframe for a downlink channel according to example embodiments described herein;

FIG. 2b illustrates an example subframe for an uplink channel according to example embodiments described herein;

FIG. 2c illustrates an example subframe with an EPDCCH according to example embodiments described herein;

FIG. 3 illustrates an example message exchange diagram highlighting a random access procedure according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to random access in heterogeneous communications systems. For example, a user equipment receives a set of random access channel (RACH) parameters associated with a first group of identifiers, and performs a random access procedure in accordance with the set of RACH parameters and the first group of identifiers. As another example, a communications controller receives a random access channel (RACH) preamble in accordance with a set of RACH parameters associated with a group of identifiers including an identifier of the communications controller, the RACH preamble received from a user equipment, and the RACH preamble initiating the random access procedure between the user equipment and the communications controller, and transmits a RACH response (RAR) including an indicator of a transmission grant, the RAR transmitted in accordance with the set of RACH parameters.

The present disclosure will be described with respect to example embodiments in a specific context, namely a Third Generation Partnership Project (3GPP) Long Term Evolution (LTE) compliant communications system that uses pilot sequences transmitted by transmission points to assist UEs estimate communications channel quality. The disclosure may also be applied, however, to other standards compliant and non-standards communications systems that uses pilot sequences to assist in communications channel quality estimation.

Figure 1A:
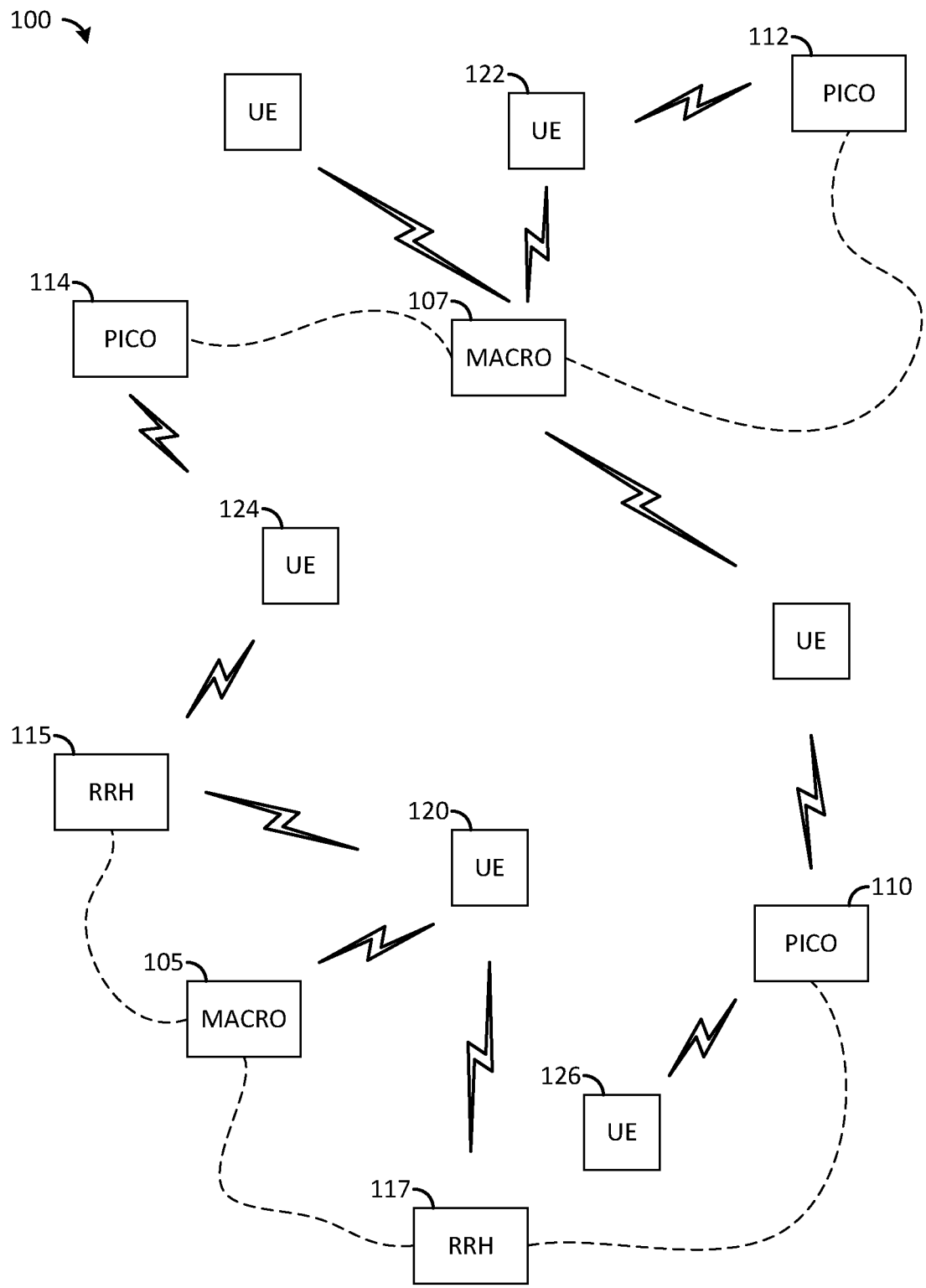
FIG. 1a illustrates an example heterogeneous communications system according to example embodiments described herein.

FIG. 1a illustrates a heterogeneous communications system 100. Generally, a heterogeneous communications system (or a heterogeneous network (or simply a HetNet)) includes an infrastructure with network entities of differing capability. As an example, there may be communications controllers such as macro cells that operate at high power (e.g., eNBs, BS, and the like) that are part of a planned infrastructure implemented and maintained by the operator of the HetNet. There may be communications controllers such as pico cells that operate at lower power (e.g., low power BS, femto cells, home eNBs, access points, distributed antennas, near field communications points, and the like) that may be part of the planned infrastructure (and implemented and maintained by the operator of the HetNet) or installed by individual customers of the operator (referred to herein as an unplanned infrastructure) to help improve coverage in poor signal areas, help improve throughput, increase reliability, and the like. The HetNet may also include remote antennas, such as remote radio heads (RRH), device-to-device (D2D) entities, and the like.

As shown in FIG. 1a, the planned infrastructure of heterogeneous communications system 100 includes macro cells 105 and 107, and RRHs 115 and 117. Pico cells 110, 112, and/or 114 may or may not be part of the planned infrastructure. If not part of the planned infrastructure, pico cells 110, 112, and/or 114 may be part of the unplanned infrastructure. Heterogeneous communications system 100 also includes UEs 120-126. Some UEs may be served by multiple cells that are part of different parts of the infrastructure (such as UE 120, served by macro 105 and RRHs 115 and 117), while some UEs may be served by multiple cells that are part of the same part of the infrastructure (such as UE 124, served by pico 114 and RRH 115) and some UEs may be served by a single cell (such as UE 126, served by pico 110).

While it is understood that heterogeneous communications systems may employ multiple eNBs, picos, and the like, that are capable of communicating with a number of UEs, only two macros, three picos, two RRHs, and a number of UEs are illustrated for simplicity.

Figure 1B:
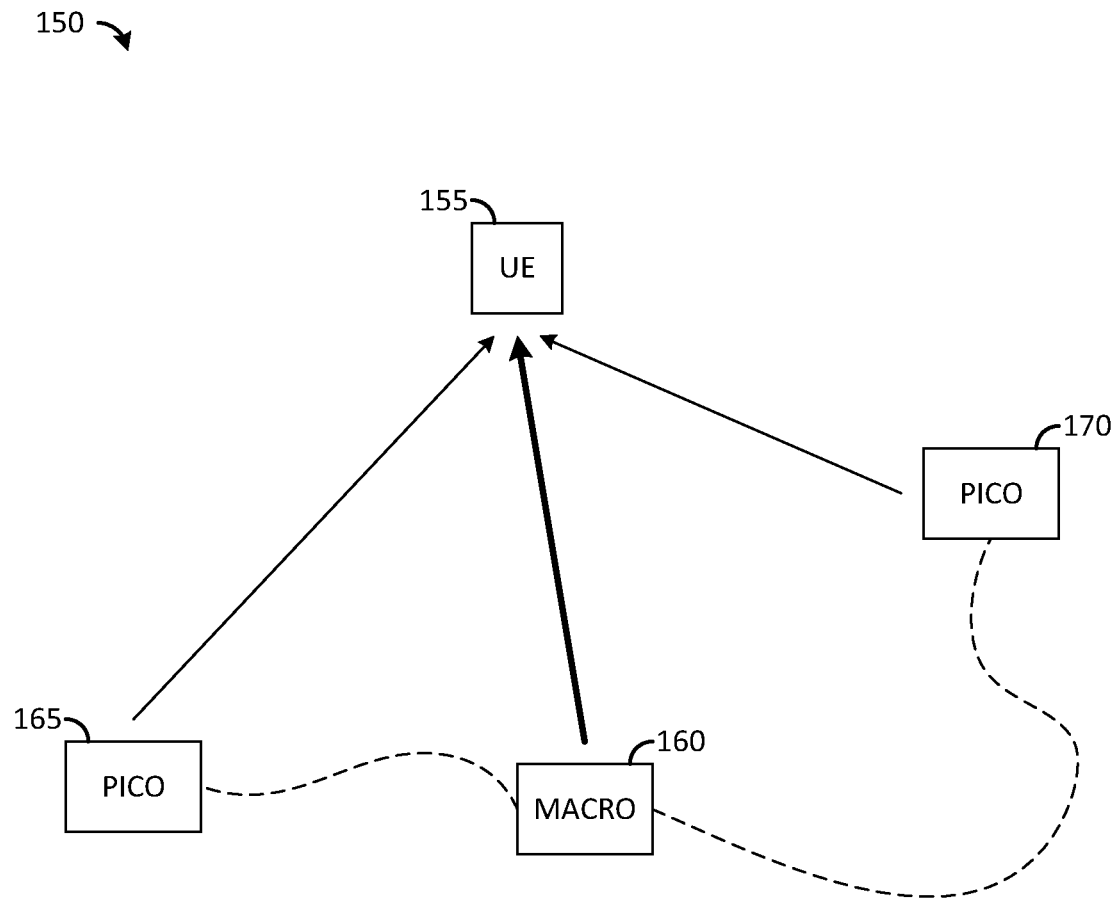
FIG. 1b illustrates an example portion of a heterogeneous communications system according to example embodiments described herein.

FIG. 1b illustrates a portion of a heterogeneous communications system 150. Heterogeneous communications system 150 includes a UE 155 that is being served by a macro cell 160, and two pico cells without physical cell identifiers, pico cell 165 and pico cell 170. In general, macro cell 160 may provide control plane functionality (including control channels), as well as broadcast information, while the pico cells provide user plane functionality, including UE-specific data. However, macro cell 160 may also provide data plane functionality.

Typically, the term standalone device (SD) may be used to describe a device that has its own cell-specific identifier, such as a physical cell identifier. Examples of SDs include eNBs, macro cells, pico cells with cell-specific identifier, controlling device of a coordinated multiple point (CoMP) set, and the like. Similarly, the term non-standalone device (NSD) may be used to describe a device that does not have its own cell-specific identifier. Examples of NSDs include pico cells without cell-specific identifier, remote antennas, remote radio heads, relays, D2D devices, UEs, and the like. It is noted that the classification of a device as a SD or an NSD may be on a per UE or UE group basis, meaning that a single device may be operating as a SD for a first UE, but as an NSD for a second UE. The classification of the device may be based on whether or not it has a cell-specific identifier with respect to a UE or a group of UEs.

Generally speaking, in orthogonal frequency division multiplexed (OFDM) systems, the frequency bandwidth of the system is divided into multiple subcarriers in frequency domain. In the time domain, one subframe is divided into multiple OFDM symbols. The OFDM symbol may have a cyclic prefix to avoid the inter-symbol interference caused by multi-path delays. One resource element (RE) is defined as the time-frequency resource within one subcarrier and one OFDM symbol. In a downlink (DL) transmission, reference signals (RSs) and other signals such as a data channel (physical downlink shared channel (PDSCH)), a control channel (physical downlink control channel (PDCCH)), and an enhanced PDCCH (EPDCCH) are orthogonal and multiplexed in different resource elements in the time-frequency domain. In an uplink (UL) transmission, physical uplink shared channel (PUSCH) and physical uplink control channel (PUCCH) are orthogonal and multiplexed in different time-frequency resources. A set of REs are grouped together to form a resource block (RB), for example, 12 subcarriers in a subframe make up a RB.

FIG. 2a illustrates a subframe 200 for a downlink channel. Data channels used to transmit data packets from an eNB to UEs in the physical layer are called physical downlink shared channels (PDSCH), such as PDSCHs 205 and 207. Corresponding physical control channels transmitted from the eNB to the UEs indicate where corresponding PDSCH is in the frequency domain and in which manner the PDSCH is transmitted are called physical downlink control channels (PDCCH), such as PDCCH 210 and 212.

FIG. 2b illustrates a subframe 230 for an uplink channel. Data channels used to transmit data packets from a UE to an eNB in the physical layer are called physical uplink shared channels (PUSCH), such as PUSCHs 235-239. PDCCHs also indicate where corresponding PUSCH is in the frequency domain and in which manner the PUSCH is transmitted.

Generally, to enable any data channels in either uplink or downlink transmissions such as PDSCH or PUSCH of a 3GPP LTE-A system, reference signals are transmitted. There are reference signals for a UE to perform channel, signal estimation, and/or measurements for demodulation of PDCCH and other common channels as well as for some measurements and feedback, which is the Common/Cell-specific Reference Signal (CRS) inherited from the 3GPP LTE Rel-8/9 specification of E-UTRA. A Dedicated/Demodulation reference signal (DMRS) can be transmitted together with the PDSCH and/or PUSCH channel in 3GPP LTE Rel-10 of E-UTRA. DMRS is used for channel estimation during PDSCH and/or PUSCH demodulation and/or EPDCCH demodulation. The PDCCH and/or EPDCCH to indicate the transmission of PDSCH and/or PUSCH may indicate the DMRS transmission. In 3GPP LTE Rel-10, Channel State Information Reference Signal (CSI-RS) is introduced in addition to CRS and DMRS. CSI-RS is used for Rel-10 UEs to measure the channel status, especially for multiple antennas cases. PMI, CQI, RI or other feedback information may be based on the measurement of CSI-RS for Rel-10 and beyond UE. PMI is the precoding matrix indicator, CQI is the channel quality indicator, and RI is the rank indicator of the precoding matrix. CSI-RS in 3GPP LTE Rel-10 can support up to 8 transmission antennas while CRS can only support maximal 4 transmission antennas in 3GPP LTE Rel-8/9. The number of CSI-RS antenna ports can be 1, 2, 4, and 8. In addition, to support the same number of antenna ports, CSI-RS has much lower overhead due to its low density in time and frequency.

A network also may comprise several component carriers (CC) operating in different frequency bands. High frequency bands generally have a high pathloss over distance so they are more suitable to serve a relatively smaller area, such as used for high throughput purpose for nearby UEs. Low frequency bands generally have low pathloss over distance so they are more suitable to serve a relatively large area, such as used for providing coverage.

In a 3GPP LTE-A compliant system, two or more CCs may be aggregated to support wider bandwidth, each CC with the bandwidth of up to 20 MHz. There will be an independent hybrid automatic repeat requested (HARQ) entity for each CC. For each HARQ entity, there is an ACK/NACK feedback corresponding to the HARQ entity. For each HARQ entity, there is a downlink control channel (PDCCH or enhanced PDCCH) to indicate the PDSCH resource allocation information of that HARQ entity. In a 3GPP LTE-A compliant system, if downlink transmission of PDSCH of a UE is scheduled on multiple downlink CCs simultaneously, the ACK/NACK feedbacks for all the downlink CCs of the UE may be transmitted on one uplink CC. For example, in FIG. 2b, PUCCH 235 can be used to transmit uplink ACK/NACK signaling.

Figure 2D:
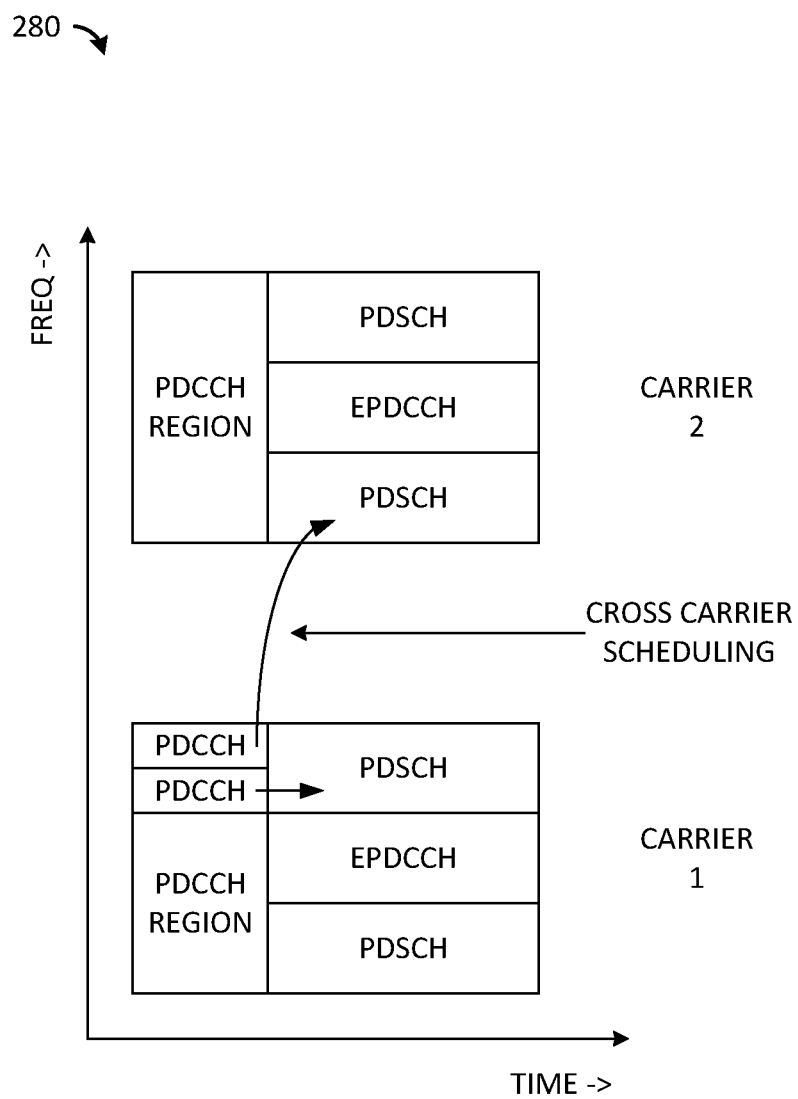
FIG. 2d illustrates two example subframes highlighting cross carrier scheduling according to example embodiments described herein.

FIG. 2c illustrates a subframe 260 with an EPDCCH. As shown in FIG. 2c, EPDCCH 265 is a downlink control channel to have a similar functionality as a PDCCH, but the transmission of EPDCCH may be in region 270 that would be in a data region of a subframe of a 3GPP LTE Rel-8 system. Furthermore, EPDCCH demodulation is based on the DMRS as opposed to CRS-based demodulation for PDCCH. The PDCCH or EPDCCH to indicate a PDSCH transmission in a component carrier may be located in the same component carrier as the PDSCH. The PDCCH or EPDCCH to indicate a PDSCH and/or PUSCH transmission in a component carrier may be located in another component carrier. For example, the PDCCH in primary component carrier can indicate the PDSCH in a secondary component carrier. In this case, there is a carrier indicator field in PDCCH to indicate which component carrier carries the PDSCH. The scheduling scheme is called cross carrier scheduling. FIG. 2d illustrates two subframes 280 highlighting cross carrier scheduling.

In the 3GPP LTE Rel-10 specification, a cell also refers to a component carrier. When multiple cells are controlled by a single eNB via a fast backhaul connection, cross scheduling of multiple cells is possible to implement because there may be a single scheduler in the single eNB to schedule for the multiple cells.

A HetNet may also have multiple types of access technologies. As an illustrative example, a 3GPP LTE compliant HetNet can provide service through and switch between a cellular network and a wireless local area network (WLAN). A HetNet may be used in any combination of macrocells, picocells, femtocell, and WiFi (IEEE 802.11 technical standard compliant wireless local area network) to offer wireless coverage and handoff across a wide range of coverage areas.

Both homogeneous and heterogeneous networks may also employ coordinated multiple-point (CoMP) transmission and/or reception. In 3GPP LTE Release-11 (Rel-11) and/or beyond, there may be several scenarios described in 3GPP TR 36.819, which are presented below, all of which assume the presence of fast backhaul connections among distributed points (e.g., transmission points and/or reception points).

Scenario 1—Homogeneous network with intra-site CoMP.

Scenario 2—Homogeneous network with high transmit power RRHs.

Scenario 3—Heterogeneous network with low transmit power RRHs within macrocell coverage where the transmission points and/or reception points formed using the RRHs have different cell identifiers from the macro cell.

Scenario 4—Heterogeneous network with low transmit power RRHs within macrocell coverage where the transmission points and/or reception points formed using the RRHs have the same cell identifiers as the macro cell.

In Scenario 4, a single shared cell identifier is used for multiple points. In such a scenario, cell identifier based transmission set configuration is not applicable. CSI-RS based configuration is reasonable for Scenario 4 instead of cell identifier based configuration. In Scenario 3, a pico (or in general, a low power node) with a different cell identifier from a macro (or in general, a high power node) generally has all of the functionalities of a cell, for example, control plane functionalities are usually managed by the pico itself. The pico may be considered to be a standalone pico (or a standalone device (SD)). On the other hand, a pico may not have all of the functionalities of a cell, for example, some control plane functionality may be managed by another node (e.g., a macro) or the pico may not broadcast a cell identifier or the pico may not broadcast the necessary system information for initial access. The pico may be considered as a non-standalone pico (or a non-standalone device (NSD)) where certain types of UEs (e.g., legacy UEs) cannot utilize the pico for data transmission without first being associated with another cell. It is noted that a pico may be a SD in one situation and a NSD in another situation. In other words, the definition of a pico (or a node) may be situation or UE dependent.

In 3GPP LTE Release 12, dual-connectivity for a UE is considered, i.e., a UE may be simultaneously connected to two or more cells (not necessarily carrier-aggregation cells). In this situation, one cell may serve as the SD for the UE, and other cell(s) may serve as NSD(s) for the UE.

Compared to a fast backhaul, a general backhaul connection (or any backhaul, or a non-ideal backhaul) generally imposes constraints on macro-pico coordination and/or pico-pico coordination. For example, with any backhaul, the backhaul delay may be long enough to prevent macro/pico coordination on scheduling. Typically, it may be possible to characterize a backhaul in accordance to a measure such as latency. As an illustrative example, a backhaul with a latency (one-way) of 5 milliseconds (ms) or greater may be considered to be a slow backhaul. Similarly, a backhaul with a latency (one-way) of 5 ms or less may be considered to be a fast backhaul. In addition to latency, throughput (in bits per second (bps), such as mega (M) Or giga (G) bps) may also be used to categorize a backhaul. Table 1 illustrates the characterization of several example backhauls. It is also possible to characterize a backhaul based on a number that is relatively independent of prevailing technology. As an example, the latency of a backhaul may be expressed as the time duration of a number of bits, symbols, frames, subframes, and the like, that may be transmitted. Utilizing the example provided above, it may be possible to characterize a backhaul as a fast backhaul if its latency is less than 5 subframes or as a slow backhaul if its latency is greater than 5 subframes. It is noted that the examples of 5 ms and/or 5 subframes are intended for discussion purposes only and not to be limits on the scope or spirit of the example embodiments.

TABLE 1

Example Backhaul Characterizations.

| Backhaul Technology | Latency (One-Way) | Throughput | Characterization |
|---|---|---|---|
| Fiber 1 | 10-30 ms | 10M-10 G bps | slow |
| Fiber 2 | 5-10 ms | 100-1000M bps | slow |
| DSL | 15-60 ms | 10-100M bps | slow |
| Cable | 25-35 ms | 10-100M bps | slow |
| Wireless | 5-35 ms | 10-100M bps | slow |
| Fiber 3 | 2-5 ms | 50M-10 G bps | fast |

Random access may be used for several purposes. As an example, with a UE that is in the RRC_CONNECTED state without uplink synchronization, random access may be used for uplink synchronization when there is a need of uplink data and/or control transmission. Additionally, with a UE that is in the RRC_CONNECTED state without uplink synchronization, random access may be used for uplink synchronization when there is a need to transmit ACK/NACK in the uplink for new downlink data. Furthermore, with a UE that is in the RRC_CONNECTED state with uplink synchronization, random access may be used for sending a scheduling request (SR). Random access may be used during RRC_CONNECTED handover. With respect to transition from a RRC_IDLE state to a RRC_CONNECTED state, random access may be used for initial access or tracking area update. Random access may also be used for recovering from radio link failure.

FIG. 3 illustrates a message exchange diagram 300 highlighting a random access procedure. Message exchange diagram 300 displays messages exchanged between a UE 305 and an eNB 310 as the two devices perform a random access procedure. Although message exchange diagram 300 illustrates a situation wherein a UE performs a random access procedure with an eNB, the UE may perform the random access procedure with other devices, such as a macro, a high power node, a point, a pico, a low power node, and the like.

The random access procedure may begin with UE 305 transmitting a random access preamble (i.e., on a random access channel (RACH) or a physical RACH (PRACH)) to eNB 310 (shown as even 312). eNB 310 may transmit a random access response (RAR) to UE 305 utilizing a PDSCH which is generally indicated by a PDCCH or an EPDCCH (shown as event 314). UE 305 may transmit a Message 3 (e.g., an RRC connection request) to eNB 310 using a scheduled transmission opportunity UL-SCH (e.g. PUSCH), for example (shown as event 316). Contention resolution may be performed if needed (shown as event 318).

HetNets can generally support random access with low power nodes directly as described in Scenario 3. In HetNets, Scenario 4 with a fast backhaul connection, there may be a shared cell identifier for typically one macro and a number of non-standalone picos (i.e., NSDs). In Scenario 4, there is usually no need for multiple RACH intended for the macro and the non-standalone picos respectively since the CRS may be transmitted, in one case, by all of the macro and the non-standalone picos and the single RACH technique may be sufficient (based on path loss estimation using the CRS for power control), or in another case, by only the macro and hence the single RACH technique is also sufficient.

The presence of any backhaul (e.g., fast backhaul or slow backhaul) generally imposes constraints on coordination between macros and picos. With a slow backhaul, the delay can be sufficiently long to prevent coordination between macro and picos for scheduling and fast coordination purposes. In a typical implementation, the macro provides control plane functionality, broadcast information, PDCCH, and data transmission associated with the PDCCH, while the picos provide UE specific information, EPDCCH, and data transmission associated with the EPDCCH.

In a scenario referred to as virtual cell scenario, a macro and a pico(s) may be connected via any backhaul, with the macro providing control plane, broadcast information, PDCCH and/or EPDCCH (but ordinarily PDCCH), and data transmission associated with the PDCCH and/or EPDCCH, and the pico(s) providing UE specific information, PDCCH and/or EPDCCH (but ordinarily EPDCCH), and data transmission associated with the PDCCH and/or EPDCCH. In the virtual cell scenario, the pico(s) may not be a SD. Therefore, the pico(s) may be referred to as a virtual cell(s) which may be a NSD(s).

Suppose that in a virtual cell scenario, a RACH is supported only at the macro for each carrier common to both the macro and the pico(s). A problem that may arise is RACH interference, as well as excessive power consumption. A UE has to transmit using a RACH only to the macro even if the UE is at the center of a pico coverage area. The power of a transmission on the RACH is based on the macro to UE pathloss, so if the macro-UE distance is large, the transmit power on the RACH is high. Thus transmission on the RACH causes high interference to receptions at the pico(s). In certain situations, the transmissions may cause a receiver of the pico to saturate and the pico can receive nothing. To resolve the interference problem, a solution may be that the pico(s) do not schedule UE transmissions on the network resources (e.g., time, frequency, or time-frequency resources) that overlap with the RACH even if the UE is very close to the pico(s). However, not utilizing overlapping network resources may reduce the efficiency. Additionally, power consumption of the UE is high since it needs to transmit on the RACH at a high power level, thereby shortening its battery life. If, instead, a UE can transmit on the RACH to a pico(s), it can reduce interference and power consumption, in both fast and any backhaul situations.

Another problem that may arise is RACH capacity limitation. If the number of virtual cells is large, the capacity of the RACH can be very limited and the macro becomes a bottleneck. To increase RACH capacity, the macro may allocate more RACH transmission opportunities on more network resources. However, this implies that the pico(s) not schedule UE transmissions on any overlapping network resources (to reduce interference), or to schedule on overlapping network resources with a risk of unreliable communications (due to possible collisions of transmissions in the RACH). In a HetNet using time division duplexing (TDD), a virtual cell may be forced to use many subframes in the UL and therefore not be able to adapt (i.e., change some of the UL subframes into DL subframes). If a UE is permitted to transmit on the RACH to a pico, RACH capacity may be increased as well as offload RACH capacity from the macro.

Yet another problem that may arise is increased complexity and latency. In a situation where a UE (in a RRC_CONNECTED state with a pico) loses its UL synchronization with the pico, the UE may need to transmit on a RACH to the macro to re-synchronize with the macro. This adds additional complexity for the macro. In general, the macro will not only need to perform RACH communications for all UEs within its coverage area, but it is also forced to handle a significant amount of coordination that may be avoidable or may be performed with reduced overhead and latency. System complexity and latency may be reduced if the UE is allowed to transmit on the RACH to a pico when needed. Therefore, it is useful to support RACH communications at picos in the virtual cell scenario, even if the pico is intended to be used as a NSD and to have the macro manage its control plane functionalities.

Yet another problem that may arise is timing. A number of cases need to be considered. First, consider a fast backhaul case with the macro and the picos in the same timing advance group (TAG). It is noted that a TAG is a group of nodes having an UL to which the same timing advance applies and/or using the same timing reference. The notion of a TAG is often used for carrier aggregation but may be adapted to broader contexts. In this situation, a single transmission on a RACH (to initialize a random access procedure, for example) may be sufficient for timing synchronization purposes (although RACH interference and RACH capacity limit issues may still remain depending on implementation and call for multiple RACH transmissions). That is, if a UE needs to synchronize its UL timing with any node within the TAG, it may accomplish this by transmitting on the RACH to any node (e.g., the macro) in the TAG. When the UE acquires timing from the macro, it may also acquire timing from any of the other nodes in the TAG. Furthermore, all of the nodes will immediately (or substantially immediately) know that the UE has acquired timing due to the presence of the fast backhaul.

Second, consider a fast backhaul case with the macro and the picos in different TAGs. Apparently, a single transmission on a RACH (to initialize a random access procedure, for example) is no longer sufficient. Support for multiple transmissions on RACHs (at least TAG-specific transmissions on RACHs) is needed. Third, consider an any backhaul case with the macro and the picos in the same TAG. The same timing between the geographically separated nodes is generally difficult to guarantee over any backhaul, but even if it is guaranteed, it does not make a one RACH transmission solution (to initialize a random access procedure, for example) desirable. To see this, suppose the UE makes a transmission on a RACH to the macro and acquires the timing. Then the UE can communicate with the macro in both the DL and UL. But if a pico does not support RACH transmission, the pico does not know if the UE has acquired the timing or not until the macro notifies the pico about the timing. That notification may take a long time to reach the pico due to the large delay of the any backhaul. This may severely impact the communications system's ability to communicate with the UE from more than one node during a same time span and may not be desired. This implies that, even with the assumption that the nodes are in the same TAG, it may be desired that the nodes connected by any backhaul should support different RACHs. Fourth, consider an any backhaul case with the macro and the picos in different TAGs. Clearly, multiple RACH transmissions (to initialize multiple random access procedures, for example) should be supported.

A number of issues regarding random access support in the virtual cell scenario have been discussed. Similar issues may arise in other scenarios, such as small cell scenarios with dual connectivity considered in 3GPP LTE Release 12. Analysis of the issues leads to a conclusion that random access support in multiple nodes is needed. Various example embodiments presented below provide transmission, reception, and signaling methods and systems for random access in a HetNet, where a macro and picos may share some common component carriers and may be connected via a fast backhaul or any backhaul. An example embodiment supports random access at both the macro and NSDs even if the macro and the picos are in the same component carrier, potentially leading to reduction in random access interference to the communications system and the UEs, reductions in UE power consumption, reductions in operational complexity and latency, and provided timing support. It is noted that the discussion focuses on a situation where the macro and the picos share a common component carrier. However, the example embodiments may be operable in situations where the macro and the picos have different component carriers.

In general, a NSD is a device (such as a pico) in a given situation without full common channel and/or control plane support. In a CoMP scenario or a virtual cell scenario with NSDs, a SD (such as a macro) may control a number of NSDs. The SD and the NSDs may share a common component carrier, but in some cases, the SD and a NSD may have different component carriers. As an example, the NSD may be in another component carrier with a new carrier type. The NSDs may not have their own control plane functionalities because the control plane functionalities are typically managed by the SD for a UE. As an illustrative example, the NSD may not have normal RACH functionality.

According to an example embodiment, the NSD also supports RACHs so that a UE may directly perform random access with a NSD and establish data transmissions with the NSD with reduced power consumption, interference, latency, and complexity, along with improved timing. Furthermore, in a virtual cell scenario, multiple nodes may be connected via a fast backhaul (or similarly, an ideal backhaul) or may be connected via any backhaul (or similarly, a slow backhaul, a non-ideal backhaul, a non-negligible-latency backhaul, and the like).

According to an example embodiment, node groups separated by any backhaul are configured for a UE, and within each group, one or more RACHs are assigned to the UE. According to an example embodiment, even if two nodes are connected by a fast backhaul, separate RACHs are desired. Therefore, there may be signaling from the network to provide a UE with information about groupings of node resources. As an example, the information may be about one or more groups of node resources. For each group of node resources, information about one or more RACH parameter sets associated with the group of node resources is signaled by a SD and each RACH parameter set may be signaled to be associated with one or more resources in the group of node resources. As an example, each RACH parameter set may be signaled to be associated with a CSI-RS or a subgroup of CSI-RSs of the group of CSI-RSs, and each RACH parameter set contains necessary configuration parameters for a UE to complete its random access procedure with associated node resources. Example embodiments may be implemented in wireless communications systems, such as homogeneous networks, HetNets, and the like, as well as over-the-air communications between SDs (such as donor eNBs) and NSDs, and NSDs (such as UEs, handsets, macros, RRHs, micro, picos, access points, and the like).

According to an example embodiment, support for a UE to perform a random access procedure directly with a NSD is provided, even if the NSD does not have all control plane functionalities. A random access procedure may be intended for a specific NSD by assigning different RACH preambles to different NSDs. Assignments may be signaled by way of SD and/or NSD broadcast or UE specific signaling (e.g., RRC signaling). In general, a UE may not be configured to see a NSD as a cell. Namely, the UE only sees a set of CSI-RS resources. The UE may also see a set of DMRS resources with DMRS virtual cell IDs, the UE may also see a set of EPDCCH resources with EPDCCH virtual cell IDs, and the like. The UE may not receive information about which of these resources correspond to the same NSD. In such a situation, the UE may need to be configured to associate NSD specific RACH preambles with NSD specific CSI-RS resources. On the other hand, if the NSD has a cell identifier (or a virtual cell identifier), the NSD specific RACH preambles may also be associated with the cell identifier (or the virtual cell identifier) of the NSD. Typically, a resource specific RACH parameter set is configured to the UE through signaling, and the resource can be CSI-RS, cell identifier, virtual cell identifier, and the like, while the RACH parameter set is associated with a resource or a group of resources. The UE may use the information about the corresponding resources for RACH transmissions and completing the random access procedure. As an example, the UE may use the CSI-RS for pathloss estimation in order to perform power control for the random access procedure. Generally, only the NSD associated with the assigned RACH preamble responds to the UE using the PDCCH and/or EPDCCH associated with the preamble of the NSD and other NSDs do not respond to the RACH. In some situations, any other NSD connected to the NSD via a fast backhaul may respond to the RACH preamble for the NSD. However, the SD may receive and decode the RACH preamble to the NSDs in the virtual cell if the RACH preamble is transmitted with sufficient power to reach the SD.

According to an example embodiment, power control for the RACH preamble to a NSD may be based on pathloss from the NSD to the UE and a signaled power offset. As an example, the UE may use the CSI-RS and/or CRS from the NSD to perform pathloss estimation for purposes of power control for the RACH preamble to the NSD. Having knowledge about an association between the NSD, NSD specific RACH parameters, and NSD specific power control parameters (e.g., NSD pathloss and power offset), the UE may select power control parameters and procedure to perform random access when it decides to perform a random access procedure with the NSD. The UE may obtain more accurate timing advance information from the NSD directly.

Example embodiments are generally described for a situation where CSI-RS based signaling, and channel and pathloss measurements are used. However, the example embodiments are applicable to more generic designs, such as pathloss measurements based on general UE specifically configured resource elements (REs), including CSI-RS REs, part or entire CRS REs, reduced CRS REs, part or entire PDSCH REs, newly designed RS REs, enhanced CSI-RS REs, and/or other REs.

An alternative to the NSD specific preamble is to assign RACH transmission opportunities at different subframes and/or different physical resource blocks (PRBs) for different NSDs. In other words, instead of using NSD specific preambles to distinguish the NSDs, NSD specific RACH transmission opportunities may be used to distinguish the NSDs. The random access procedure utilizing RACH transmission opportunities on different subframes and/or different PRBs may not be optimal for initial access following UE power up as more information may need to be signaled regarding the RACH transmission opportunities during initial access. However if the overhead is not a concern it may still be viable. Initial access may be based on the SD's CRS, management information block (MIB), system information block (SIB), and or PDCCH. The NSD typically has only a portion of the control plane functionality and it may be especially well adapted for use when the UE directly sends a scheduling request (SR) to the NSD. As an example, without a NSD specific SR, the UE needs to transmit a SR to the SD and the SD may forward the SR to a corresponding NSD using a backhaul, which may result in large latency if the backhaul is a slow backhaul. On the other hand, with a NSD specific SR, the UE may directly send the SR to the NSD with reduced overhead and latency. The example embodiments presented for random access procedure may also be utilized for transmitting SRs.

Although the discussion of the example embodiments focus mainly on NSD specific RACHs, the example embodiments may also be applicable to NSD group specific RACHs, TAG specific RACHs, CSI-RS specific RACHs, RS specific RACHs (e.g., a set of CSI-RS and/or CRS), or in general, resource specific RACHs, resource group specific RACHs, resource subgroup specific RACHs (wherein the resource subgroup is a subset of a resource group), PDCCH specific RACHs, EPDCCH specific RACHs, and the like. Therefore, the discussion of NSD specific RACHs should not be construed as being limiting to the spirit or the scope of the example embodiments.

In order to support NSD specific random access in the virtual cell scenario, an entity (e.g., an eNB or a network entity) may assign different RACH preambles to different NSDs or different NSD groups, and or assigns different RACH resources (e.g., time-frequency resources) to different NSDs or different NSD groups. The entity may signal NSD specific (or NSD group specific) RACH preambles (or RACH resources) to UEs. The entity may or may not have broadcast the RACH preambles or RACH resources. The entity, if a macro, may broadcast or unicast the RACH preambles or the RACH resources for the macro and possibly for NSDs, while if a NSD, may unicast the RACH preambles or the RACH resources. A UE may receive the signaling of the NSD specific (or NSD group specific) RACH preambles (or RACH resources) from the entity, and transmit a RACH preamble to a SD or a NSD on a RACH resource (the parameters for which were received in signaling from the entity).

A SD or a NSD may receive the RACH preamble on the RACH resource (both the RACH preamble and the RACH resource may need to be admissible (in other words, they need to be valid, and have been signaled to the UE)) and transmits a RAR to the UE. As the UE receives the RAR, it may proceed to complete the random access procedure. It may be possible that the UE receives multiple RARs. In such a situation, the UE may select one or more of the received RARs and completes the random access procedure.

Typically, when a UE performs the random access procedure in the virtual cell scenario, it may be possible for multiple nodes (SDs and/or NSDs) to receive the RACH preamble. The receipt of multiple RACH preambles may be used to configure the UE to connect to NSDs. As an illustrative example, if a UE powers up and transmits a RACH preamble to a SD, multiple nodes may receive the RACH preamble. The nodes may measure the received signal strength and forward information related to the received signal strength to the SD (e.g., using any backhaul connection). The SD may use the received signal strength information and determines a CSI-RS configuration and/or a CoMP set for the UE. As an example, the top 5 NSD's CSI-RS may be configured (by an entity in the communications system, which may be referred to as the network side) as the CoMP set for the UE (or be members of the UE's resource management set) and the best NSD (in terms of received signal strength, for example) may be selected for data transmission with the UE. It is noted that the operations as described in the illustrative example may require backhaul signaling support for the exchanging of the received signal strength information used in NSD selection.

If a fast or ideal backhaul is present, the best NSD may, as instructed by the SD, respond directly to the UE. As an example, the best NSD may transmit a RAR to the UE or transmit a message using RRC to the UE. Therefore, the selection of the best NSD and connection thereto may be performed in fewer steps when compared to a typical power on initial connection and handover combination. If a slow backhaul is present, the UE may initially connect to the SD and then perform a virtual handover to the best NSD (i.e., only some user plane functionality is handed over with most control plane functionality still being supported by the SD). The UE may not need to identify the best NSD in order to be connected to the best NSD.

A device or a portion of a device (e.g., a subset of antennas of a device, local antennas of a device versus remote antennas of a device, a sector(s) of antennas of a device, and the like) or a set of resources associated with a device may be identified by an identifier(s) (or equivalently, have an identity), such as a cell identifier, a physical cell identifier, a virtual cell identifier, and the like. As related to a random access procedure, an identifier associated with a device or a portion of a device or a set of resources associated with a device may be used to generate modulated pseudo-random sequences for reference signals (such as CRS, CSI-RS, DMRS, and the like) and to scramble bit streams (such as PDSCH data). The identifier may need to be known at a receiver, such as a UE (when the UE is receiving downlink signals) or an eNB (when the eNB is receiving uplink signals), in order to demodulate and/or de-scramble the reference signals and/or bit streams. Otherwise, the receiver will be unable to demodulate and/or de-scramble the reference signals and/or bit streams.

In a random access procedure, after a device that is part of the communications system, i.e., a network side device such as a SD or NSD, receives the RACH preamble, it does not know which UE transmitted the RACH preamble. Hence it generally cannot use a UE specific identifier to modulate and/or scramble the RAR. Instead, the device may use a RACH specific identifier or an identifier signaled to the UEs so that the UE can demodulate and/or de-scramble the RAR. In addition, if the Message 3s are transmitted using different identifiers by different UEs, the device may not be able to demodulate and/or decode the Message 3s.

As an illustrative example of the use of identifiers to generate pseudo-random sequences and scrambling bit streams, consider 3GPP TS36.211, Section 5.5.1.5 Determining virtual cell identity for sequence generation for uplink reference sequences, which states: The definition of $n_{ID}^{RS}$ depends on the type of transmission.

Transmissions associated with PUSCH:

$n_{ID}^{RS} = N_{ID}^{cell}$ if no value for $n_{ID}^{PUSCH}$ is configured by higher layers or if the PUSCH transmission corresponds to a Random Access Response Grant or a retransmission of the same transport block as part of the contention based random access procedure, $n_{ID}^{RS} = n_{ID}^{PUSCH}$ otherwise.

Transmissions associated with PUCCH:
$n_{ID}^{RS}=N_{ID}^{cell}$ if no value for $n_{ID}^{PUCCH}$ is configured by higher layers,
$n_{ID}^{RS}=n_{ID}^{PUCCH}$ otherwise.
Sounding reference signals:
$n_{ID}^{RS}=N_{ID}^{cell}$.

Similarly, for PUSCH bit stream scrambling, 3GPP TS36.211, Section 5.3.1 Scrambling states: The scrambling sequence generator shall be initialised with $c_{init}=n_{RNTI} \cdot 2^{14}+q \cdot 2^{13}+\lfloor n_s/2 \rfloor \cdot 2^9+N_{ID}^{cell}$ at the start of each subframe where $n^{RNTI}$ corresponds to the RNTI associated with the PUSCH transmission as described in Section 8 of 3GPP TS36.211. Furthermore, for PUSCH resource hopping, 3GPP TS36.211 Section 5.3.4 Mapping to physical resources states: The pseudo-random sequence generator shall be initialised with $c_{init}=N_{ID}^{cell}$ for frame structure type 1 and $c_{init}=2^9 \cdot (n_f \bmod 4)+N_{ID}^{cell}$ for frame structure type 2 at the start of each frame.

Additionally, for CSI-RS, 3GPP TS36.211 Section 6.10.5.1 Sequence generation states: The pseudo-random sequence generator shall be initialised with $c_{init}=2^{10} \cdot (7 \cdot (n_s+1)+l+1) \cdot (2 \cdot N_{ID}^{CSI}+1)+2 \cdot N_{ID}^{CSI}+N_{CP}$ at the start of each OFDM symbol where $$N_{CP} = \begin{cases} 1 & \text{for normal } CP \\ 0 & \text{for extended } CP \end{cases}.$$

The quantity $N_{ID}^{CSI}$ equals $N_{ID}^{cell}$ unless configured by higher layers.

Furthermore, for CRS, 3GPP TS36.211 Sec. 6.10.1.1 Sequence generation states: The reference-signal sequence $r_{l,n_s}(m)$ is defined by $$r_{l,n_s}(m) = \frac{1}{\sqrt{2}}(1-2 \cdot c(2m)) + j\frac{1}{\sqrt{2}}(1-2 \cdot c(2m+1)),$$
$$m = 0, 1, \ldots, 2N_{RB}^{max,DL}-1$$

where $n_s$ is the slot number within a radio frame and l is the OFDM symbol number within the slot. The pseudo-random sequence c(i) is defined in Section 7.2. The pseudo-random sequence generator shall be initialised with $c_{init}=2^{10} \cdot (7 \cdot (n_s+1)+l+1) \cdot (2 \cdot N_{ID}^{cell}+1)+2 \cdot N_{ID}^{cell}+N_{CP}$ at the start of each OFDM symbol where $$N_{CP} = \begin{cases} 1 & \text{for normal } CP \\ 0 & \text{for extended } CP \end{cases}.$$

Also, for PDSCH DMRS, 3GPP TS36.211 Section 6.10.3.1 Sequence generation states: The pseudo-random sequence c(i) is defined in Section 7.2 of 3GPP TS36.211. The pseudo-random sequence generator shall be initialised with $$c_{init}=(\lfloor n_s/2 \rfloor+1) \cdot (2n_{ID}^{(nSCID)}+1) \cdot 2^{16}+n_{SCID}$$

at the start of each subframe. The quantities $n_{ID}^{(i)}$, i=0,1, are given by
$n_{ID}^{(i)}=N_{ID}^{cell}$ if no value for $n_{ID}^{DMRS,i}$ is provided by higher layers or if DCI format 1A, 2B or 2C is used for the DCI associated with the PDSCH transmission
$n_{ID}^{(i)}=n_{ID}^{DMRS,i}$ otherwise
The value of $n_{SCID}$ zero unless specified otherwise. For a PDSCH transmission on ports 7 or 8, $n_{SCID}$ is given by the DCI format 2B, 2C or 2D associated with the PDSCH transmission. In the case of DCI format 2B, $n_{SCID}$ is indicated by the scrambling identity field according to Table 6.10.3.1-1. In the case of DCI format 2C or 2D, $n_{SCID}$ is given by Table 5.3.3.1.5C-1.

Additionally, for EPDCCH DMRS, 3GPP TS36.211 Section 6.10.3A Demodulation reference signals associated with EPDCCH states: The pseudo-random sequence c(n) is defined in Section 7.2 of 3GPP TS36.211. The pseudo-random sequence generator shall be initialised with $$c_{init}=(\lfloor n_s/2 \rfloor+1) \cdot (2n_{ID,i}^{EPDCCH}+1) \cdot 2^{16}+n_{SCID}^{EPDCCH}$$

at the start of each subframe where $n_{SCID}^{EPDCCH}=2$ and $n_{ID,i}^{EPDCCH}$ is configured by higher layers. The EPDCCH set to which the EPDCCH associated with the demodulation reference signal belong is denoted $i \in \{0,1\}$.

Also, for PDSCH bit stream scrambling, 3GPP TS36.211 Section 6.3.1 Scrambling states: For each codeword q, the block of bits $b^{(q)}(0), \ldots, b^{(q)}(M_{bit}^{(q)}-1)$, where $M_{bit}^{(q)}$ is the number of bits in codeword q transmitted on the physical channel in one subframe, shall be scrambled prior to modulation, resulting in a block of scrambled bits bit $\tilde{b}^{(q)}(0), \ldots, \tilde{b}^{(q)}(M_{bit}^{(q)}-1)$ according to $$\tilde{b}^{(q)}(i)=(b^{(q)}(i)+c^{(q)}(i)) \bmod 2$$

where the scrambling sequence $c^{(q)}(i)$ is given by Section 7.2 of 3GPP TS36.211. The scrambling sequence generator shall be initialised at the start of each subframe, where the initialisation value of $c_{init}$ depends on the transport channel type according to $$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases}$$

where $n_{RNTI}$ corresponds to the RNTI associated with the PDSCH transmission as described in Section 7.1 of 3GPP TS36.211.

Figure 4:
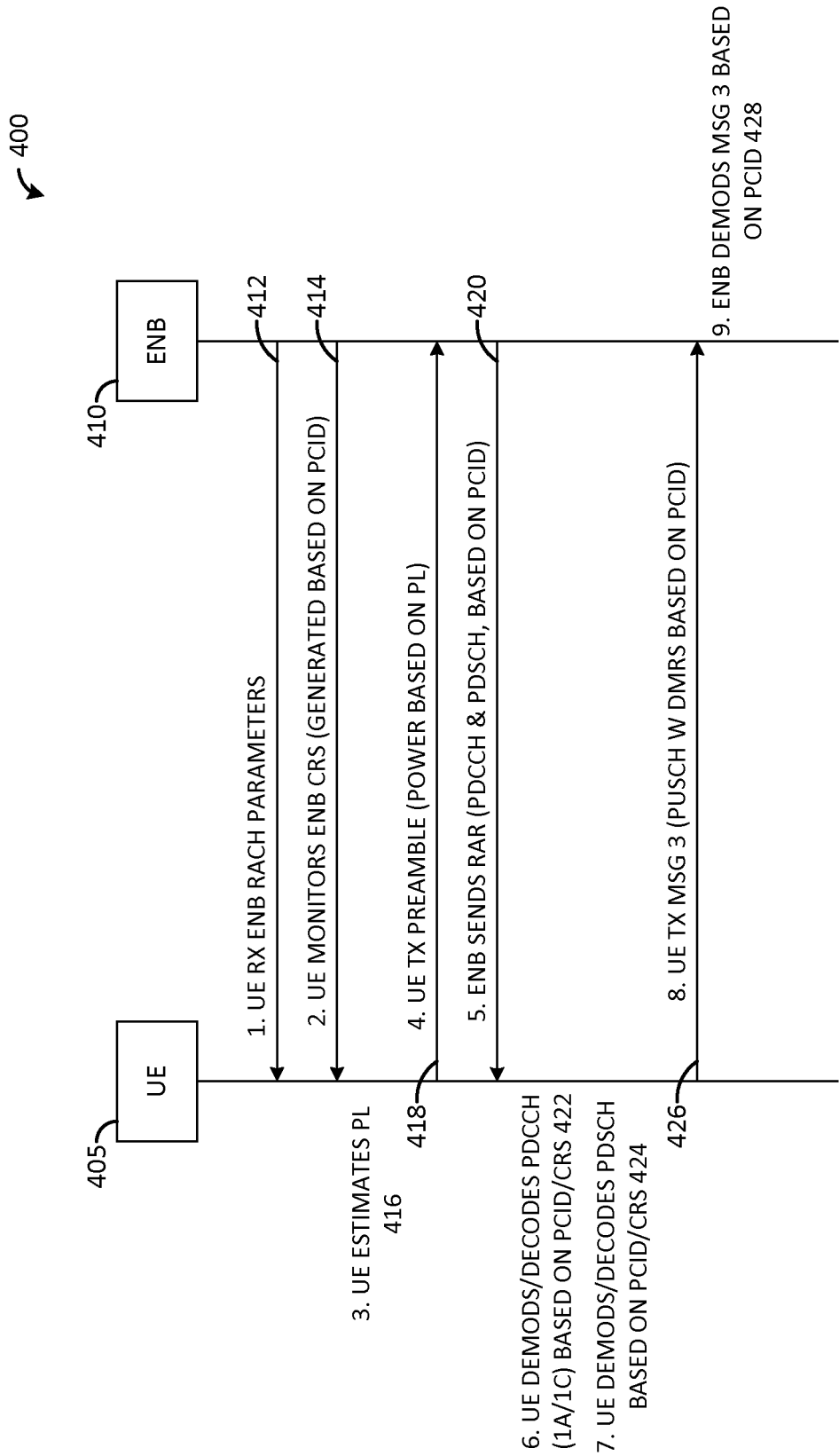
FIG. 4 illustrates an example message exchange diagram highlighting a configurable random access procedure between a UE and a SD (e.g., an eNB) according to example embodiments described herein.

In the virtual cell scenario, a node may not be fully functional cell. In other words, the node may be a NSD. Generally, associations need to be made between the NSD specific RACH preambles (or RACH transmission opportunities) and the RARs from the NSD. For discussion purposes, consider the random access process involving a SD. FIG. 4 illustrates a message exchange diagram 400 highlighting a configurable random access procedure between a UE and a SD (e.g., an eNB). Message exchange diagram 400 displays messages exchanged between a UE 405 and an eNB 410 as the two devices perform a configurable random access procedure. Although message exchange diagram 400 illustrates a situation wherein a UE performs a random access procedure with an eNB, the UE may perform the random access procedure with other devices that are SDs, such as a macro, a high power node, a point, a pico, a low power node, and the like.

UE 405 may receive a transmission from eNB 410 that includes RACH configurations or information about RACH parameters (shown as event 412). The RACH configurations may specify sets of RACH parameter values associated with different devices (such as SDs and/or NSDs) or groups of different devices that are to be used to perform random access procedures with the various devices or the groups of different devices. As an example, a RACH parameter set may include a cell identity, a EPDCCH, a PDCCH, a PDSCH, a RACH specific identifier for CRS of PDCCH, a RACH specific identifier for CRS of PDSCH, a RACH specific identifier for DMRS of PUSCH, and the like, associated with each of the various devices.

UE 405 may monitor a CRS for a device (e.g., eNB 410) that it is to perform a random access procedure with (shown as event 414). The CRS of the device may be generated in accordance with a cell identity of the device, so UE 405 is able to determine the CRS of the device from the set of RACH parameter values associated with the device. Alternatively, UE 405 may monitor a CRS for each of several devices, with each CRS being generated in accordance with a cell identity associated with the corresponding device. UE 405 may estimate a pathloss from its measurement of the CRS of the device (shown as event 416). UE 405 may transmit a RACH preamble to the device (e.g., eNB 410) with a transmit power level set in accordance with the measured pathloss (shown as event 418).

The device (e.g., eNB 410) may transmit a RACH response (RAR) to UE 405 (shown as event 420). The RAR may include a PDCCH that uses information (such as the cell identity of the device) signaled to UE 405 in the sets of RACH parameter values and a PDSCH that uses a DMRS that also uses information (such as the cell identity of the device) also signaled to UE 405 in the sets of RACH parameter values.

UE 405 may demodulate and decode the PDCCH (e.g., in formats 1A/1C) in accordance with the device's cell identity and CRS (shown as event 422) and demodulate and decode the PDSCH in accordance with the device's cell identity and CRS (shown as event 422). As discussed previously, the device's cell identity and CRS may be signaled to UE 405 in the sets of RACH parameter values. UE 405 may transmit a Message 3 on a PUSCH with a DMRS that is based on the device's cell identity (shown as event 426). The device (eNB 410) may demodulate the Message 3 using the DMRS that is based on the device's cell identity (shown as event 428).

As shown in the above illustrative example, if the UE is performing the random access procedure with a SD, there is a real cell identity that can be used to determine parameters of associated channels, such as SD specific sequence groups from DMRS of PUSCH, or SD specific scrambling code for DMRS of PDSCH. During the random access procedure, after the SD has received the RACH preamble transmitted by the UE in accordance with the signaled RACH configurations or information about RACH configurations, the SD may transmit the RAR using a PDCCH and/or EPDCCH and a PDSCH. Since the SD only knows information included in the RACH preamble and generally does not know whether the UE is in the active state and has been allocated one or more dedicated DMRS of PDSCH, the SD may need to use the SD specific DMRS for the RAR. In particular, the SD may use the SD specific scrambling code for the DMRS for the EPDCCH and/or PDSCH associated with the RAR. Similarly, when the UE receives the RAR, the UE transmits the Message 3 using the PUSCH and the UE uses the SD specific DMRS of the PUSCH instead of a dedicated DMRS for PUSCH of the Message 3 since the SD may not know if the dedicated DMRS of PUSCH has been allocated to the UE.

However, in the virtual cell scenario, there may not be a SD specific DMRS for PDSCH or a SD specific PUSCH associated with a NSD since the NSD is not a fully featured cell and has no cell identifier. The DMRS for EPDCCH, PDSCH, and PUSCH may be assigned to the UE through dedicated signaling. Different UEs may be assigned to different DMRS for EPDCCH, PDSCH, and PUSCH. Therefore, there may be problems associated with the lack of cell identifier based DMRS for EPDCCH, PDSCH, and PUSCH when used for random access which may impact the UE's and/or the NSD's ability to demodulate the DMRS sent during and after the RAR. In general, the NSD (or another node or entity) may need to inform (e.g., through signaling, such as RRC signaling) the UE about a RACH specific DMRS for an EPDCCH of the NSD, a RACH specific DMRS for a PDSCH of the NSD (the RACH specific DMRS for a PDSCH may be the same as (or different from) the RACH specific DMRS for EPDCCH for the NSD), a RACH specific DMRS for PUSCH for the NSD, and the like. The DMRS may be specific to a RACH configuration for the NSD or a set of RACH parameter values for the NSD. Alternatively, a RACH specific DMRS for EPDCCH and/or PDSCH for the NSD and a RACH specific DMRS for PUSCH for the NSD may be at least partially derived from an identifier, such as a virtual cell identifier, a group virtual cell identifier, and the like, associated with a CSI-RS or a group of CSI-RSs. The associations between the RACH preamble and the RAR may be handled in a manner similar to the way that cell identifiers are handled, but with virtual cell identifiers. Alternatively, a RACH specific DMRS for EPDCCH and/or PDSCH for the NSD and a RACH specific DMRS for PUSCH for the NSD may be at least partially derived from a CSI-RS or a group of CSI-RSs.

Figure 5:
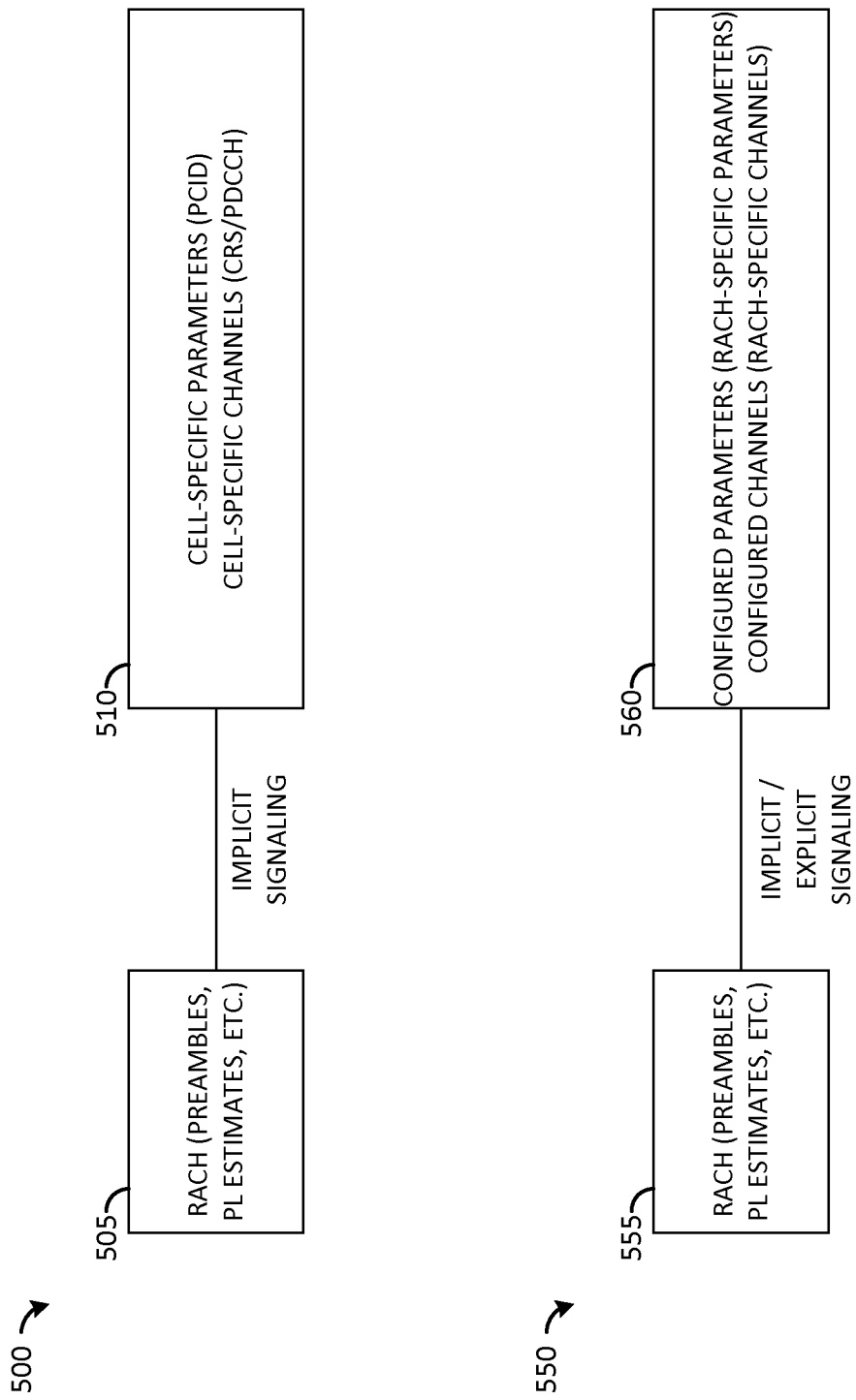
FIG. 5a illustrates an example diagram highlighting support for random access procedures for SDs according to example embodiments described herein.
FIG. 5b illustrates an example diagram highlighting support for configurable random access procedures for NSDs according to example embodiments described herein.

FIG. 5*a* illustrates a diagram 500 highlighting support for random access procedures for SDs. A random access procedure 505 involving SDs, which may involve RACH preambles, pathloss estimates, RARs, and the like, may make use of implicitly signaled information 510, such as cell specific parameters (e.g., cell identifiers) and/or cell specific channels (e.g., CRS, PDCCH, and the like).

FIG. 5*b* illustrates a diagram 550 highlighting support for configurable random access procedures for NSDs. A random access procedure 555 involving NSDs, which may involve RACH preambles, pathloss estimates, RARs, and the like, may make use of a implicitly, explicitly, or a combination thereof, information 560, such as configured parameters (e.g., RACH specific parameters) and/or configured channels (e.g, RACH specific channels).

After configuration and/or associations are made and signaled (such as shown in FIG. 5*b*) implicitly and/or explicitly, during a random access procedure, a RAR from a NSD may use a RACH specific DMRS for EPDCCH (if used) or RACH specific DMRS for PDSCH. When the UE monitors the RAR, the UE may use the RACH specific DMRS of EPDCCH to demodulate the EPDCCH (if used) and the RACH specific DMRS for PDSCH to demodulate the PDSCH. The UE may detect additional information about the RACH specific DMRS for PUSCH (if any). Generally, partial or full information about the RACH specific DMRS for PUSCH may have been previously signaled before the random access procedure initiates. The UE may use the RACH specific DMRS of PUSCH for the NSD to transmit the Message 3 and the NSD may have the corresponding information saved in order to demodulate the PUSCH.

Figure 6:
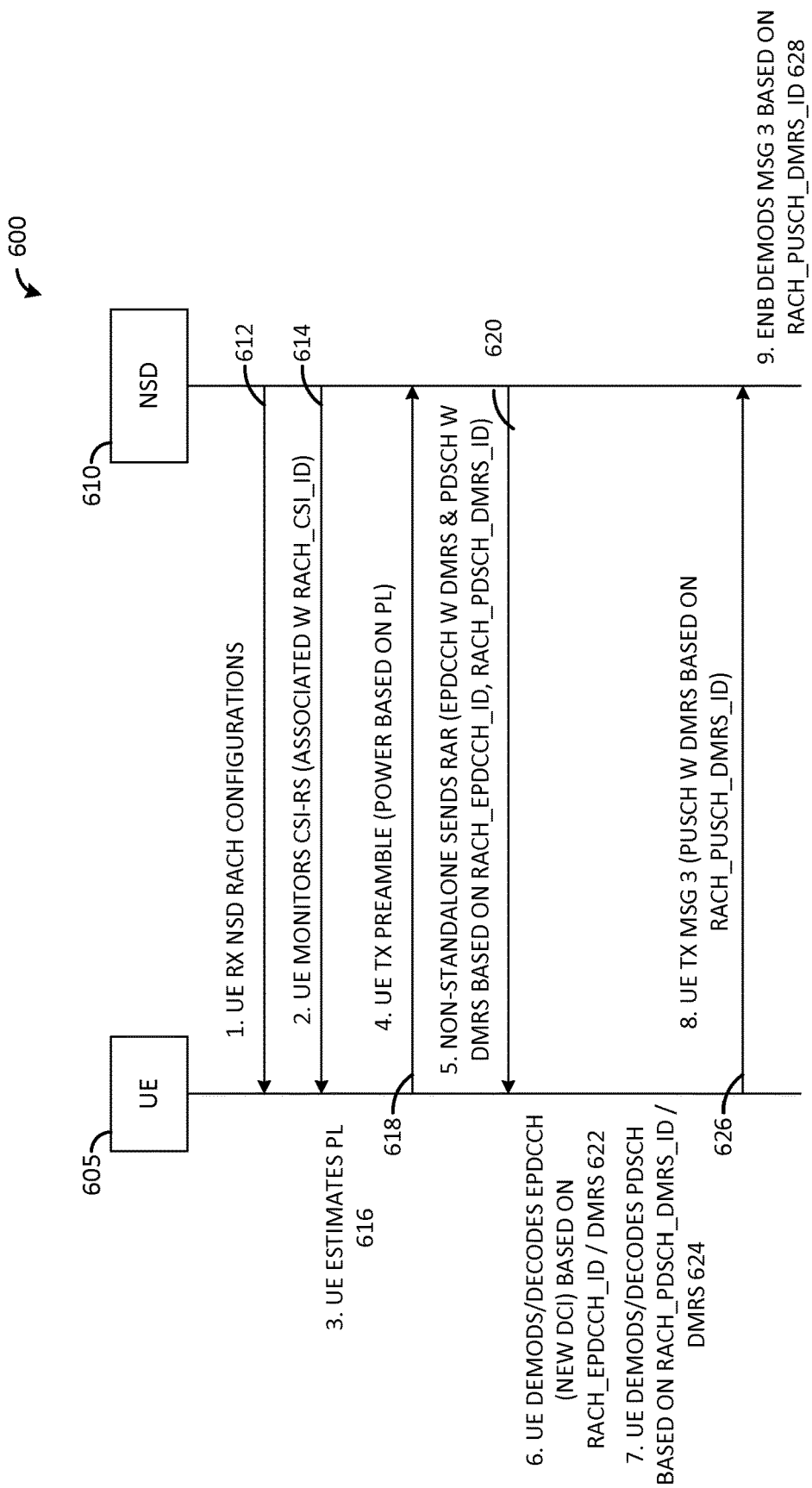
FIG. 6 illustrates a message exchange diagram highlighting a configurable random access procedure between a UE and a NSD according to example embodiments described herein.

FIG. 6 illustrates a message exchange diagram 600 highlighting a configurable random access procedure between a UE and a NSD. Message exchange diagram 600 displays messages exchanged between a UE 605 and a NSD 610 as the two devices perform a configurable random access procedure. The NSD may be a device, such as a point, a pico, a low power node, and the like.

UE 605 may receive a transmission from NSD 610 (or another node or entity) that includes RACH configurations or information about RACH configurations (shown as event 612). The RACH configurations may include a plurality of RACH parameter sets. In other words, UE 605 may receive the plurality of RACH parameter sets from NSD 610 (or another node or entity), commonly referred to as the network. Each RACH parameter set may be used for configuring a random access procedure, hence the plurality of RACH parameter sets may be used for configuring a plurality of random access procedures. Each RACH parameter set may be used to configure a random access procedure with a SD, a NSD, a group of SDs, or a group of NSDs. Each SD or NSD (or group thereof) may be associated with a RACH parameter set, but a single RACH parameter set may apply to more than one SD or NSD (or group thereof). As an example, a RACH parameter set may include a cell identity or a virtual cell identity, a PDCCH, a EPDCCH, a PUSCH, a RACH specific identifier for DMRS of PDCCH, a RACH specific identifier for DMRS of EPDCCH, a RACH specific identifier for DMRS of PDSCH, RACH specific identifier for DMRS of PUSCH, a CRS, a CSI-RS, and the like, associated with each of the various devices. Instead of a channel specific RS, the RS may be resource specific or sub-resource specific.

UE 605 may monitor a CSI-RS for NSD 610 that it is to perform a random access procedure with (shown as event 614). The CSI-RS of NSD 610 may be generated in accordance with a virtual cell identity of the device (e.g., a RACH specific identity), so UE 605 is able to determine the CSI-RS of NSD 610 from the set of RACH parameter values associated with NSD 610. Alternatively, UE 605 may monitor a CSI-RS for each of several devices, with each CSI-RS being generated in accordance with a virtual cell identity associated with the corresponding device. UE 605 may estimate a pathloss from its measurement of the CSI-RS of NSD 610 (shown as event 616). UE 605 may transmit a RACH preamble to NSD 610 with a transmit power level set in accordance with the measured pathloss (shown as event 618).

NSD 610 may transmit a RAR to UE 605 (shown as event 620). The RAR may include a PDCCH that uses information (such as the virtual cell identity of NSD 610) signaled to UE 605 in the sets of RACH parameter values and a PDSCH that uses a RACH specific DMRS for NSD 610 that also uses information (such as the virtual cell identity of NSD 610) also signaled to UE 605 in the sets of RACH parameter values.

UE 605 may demodulate and decode the PDCCH (e.g., in formats 1A/1C) in accordance with the virtual cell identity of NSD 610 and RACH specific DMRS (shown as event 622) and demodulate and decode the PDSCH in accordance with the virtual cell identity and RACH specific DMRS (shown as event 622). As discussed previously, the virtual cell identity and RACH specific DMRS may be signaled to UE 605 in the sets of RACH parameter values. UE 605 may transmit a Message 3 on a PUSCH with a RACH specific DMRS that is based on the virtual cell identity of NSD 610 (shown as event 626). NSD 610 may demodulate the Message 3 using the DMRS that is based on the virtual cell identity of NSD 610 (shown as event 628). It is noted that in the more general cases, NSD 610 may be transparent to the UE, in other words, only the virtual cell identities associated with NSD 610 are signaled to the UE, and one or more of the identities are assigned to be used during RACH procedure. The association between the virtual cell identities and NSD 610 may be known only to an entity (entities) in the communications system, i.e., the network side.

According to an example embodiment, a RACH specific DMRS may be used to support random access procedures for UEs operating in CoMP mode. UE specific DMRS of PDSCH and/or UE specific DMRS of PUSCH may be used for pairing different UEs to different DMRS in order to support CoMP operation in general, for example, the UE specific DMRSs may be chosen by the network such that the interference between concurrent DMRSs on the same time/frequency resources is reduced (such as orthogonal DMRS scrambling by choosing the DMRS virtual cell IDs). However, difficulties may arise when the UE needs to perform random access procedures with a specific point (in the case of recovering UL synchronization, for example) since UE specific DMRS of PDSCH and/or UE specific DMRS of PUSCH may not be usable in the random access procedure, since entities in the communications system generally network do not know which DMRS (out of many) is used by the UE and hence may not be able to demodulate the DMRS and PUSCH. A RACH specific DMRS may be used to support the random access procedures.

Figure 7A:
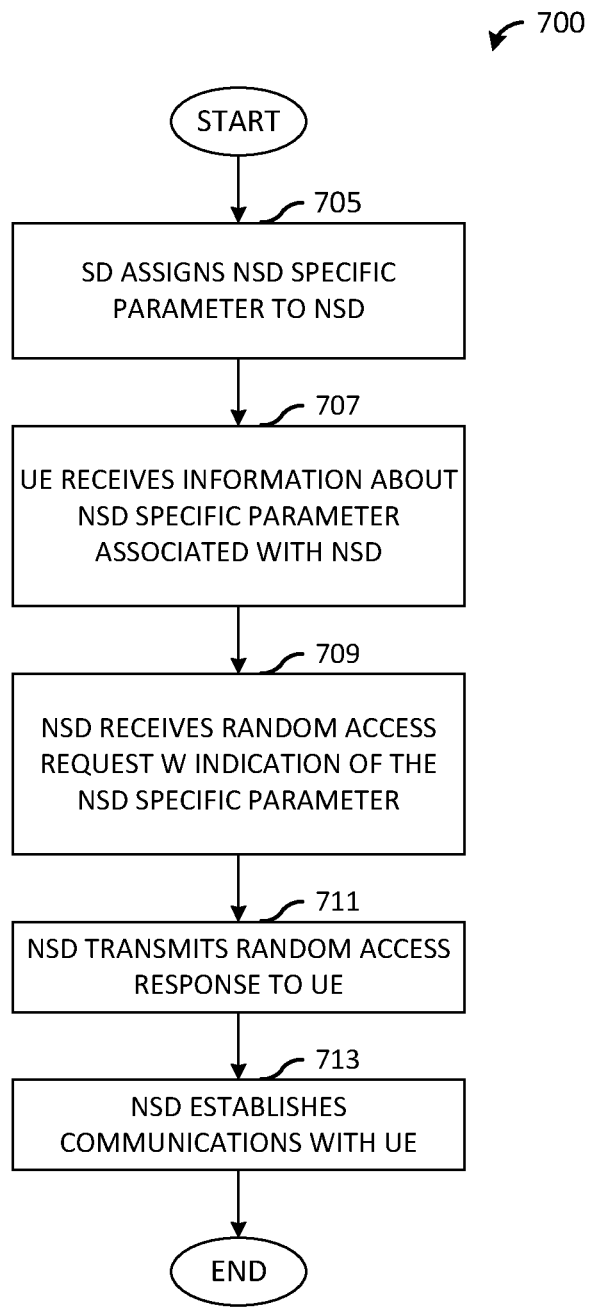
FIG. 7a illustrates an example flow diagram of operations occurring in nodes in a communications system as the nodes participate in a configurable random access procedure according to example embodiments described herein.

FIG. 7a illustrates a flow diagram of operations 700 occurring in nodes in a communications system as the nodes participate in a configurable random access procedure. Operations 700 may be indicative of operations occurring in a SD (such as a macro), a NSD (such as a pico), and a UE operating in a virtual cell scenario.

Operations 700 may begin with the SD (or a network entity) assigning NSD specific parameters to a NSD (block 705). The NSD specific parameters may be a specific RACH preamble, a subframe opportunity, a PRB opportunity, and the like, associated with the NSD. The assignment may be performed in a semi-static manner or the assignment may be a long term assignment. The UE may receive information about the NSD specific parameters that are associated with the NSD (block 707). The information may be transmitted by the SD, the NSD, a network entity, another NSD, and the like, over a broadcast channel or a unicast channel. The UE may transmit a RACH preamble indicating the received NSD specific parameters, which may be received by the NSD (block 709). The NSD may respond to the RACH preamble by transmitting a RAR to the UE with the PDCCH of the RAR (such as assigning a temporary cell radio network temporary identifier (C-RNTI) to the UE) (block 711). The DMRS of PDSCH for the RAR may be a RACH specific DMRS which is signaled to the UE. The NSD may establish communications with the UE (block 713). The establishment of communications may include the UE receiving the RAR using a RACH specific DMRS of PDSCH and transmitting a Message 3 including the C-RNTI of the UE in a PUSCH resource where the PUSCH resource is indicated by the RAR. The DMRS of PUSCH for the Message 3 may be a RACH specific DMRS of PUSCH as configured by higher layer signaling. The NSD may transmit a PDCCH and PDSCH as a response to information in the Message 3, where the PDCCH uses the C-RNTI of the UE and the DMRS of PDSCH may use the previously dedicated DMRS or network assigned UE specific DMRS instead of just a RACH specific DMRS.

According to an alternative example embodiment, another node (e.g., a SD or a NSD) may respond to the RACH preamble by transmitting a RAR to the UE. That node may be connected to the NSD by a fast backhaul. According to another alternative example embodiment, The UE may transmit a SR indicating the received NSD specific parameter and the NSD may receive it. Furthermore, the NSD may respond to the SR by transmitting a scheduling grant to the UE and data transmissions may be enabled.

Figure 7B:
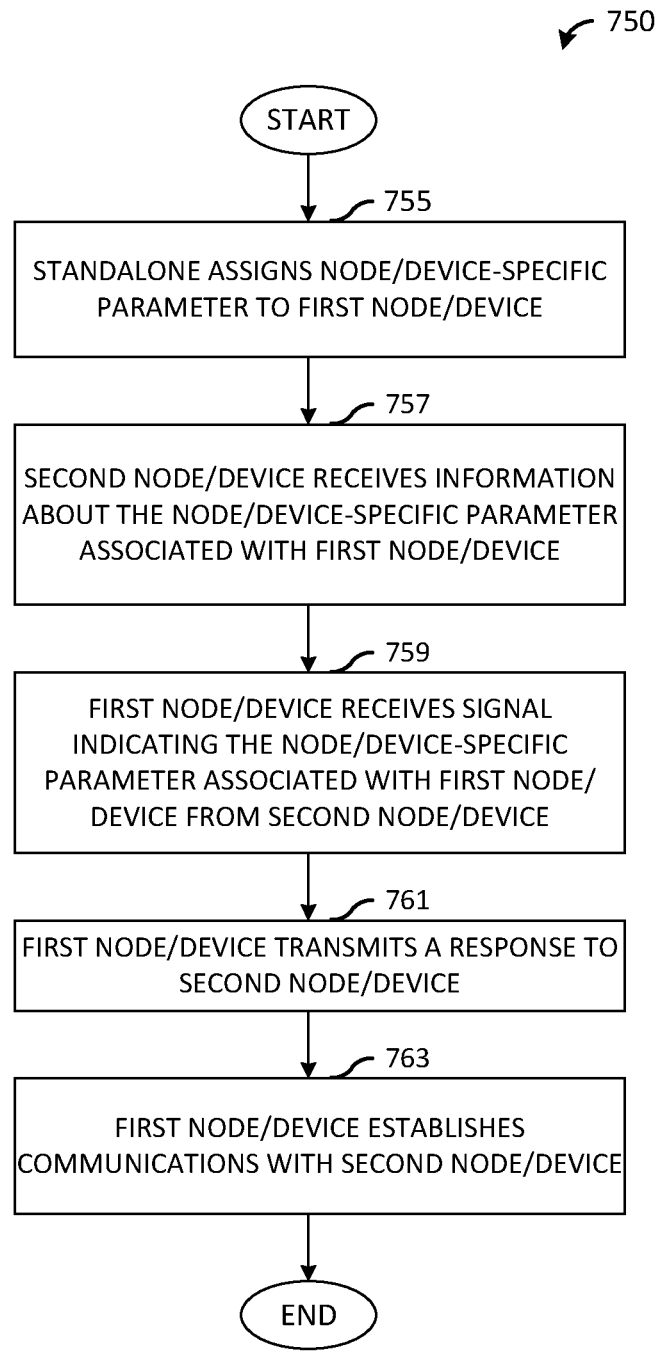
FIG. 7b illustrates an example flow diagram of operations occurring in nodes in a communications system as a first node establishes data transmissions with a second node with the assistance of a SD according to example embodiments described herein.

FIG. 7b illustrates a flow diagram of operations 750 occurring in nodes in a communications system as a first node establishes data transmissions with a second node with the assistance of a SD. Operations 750 may be indicative of operations occurring a first node (e.g., a UE) and a second node (e.g., a UE) as the first node and the second node establishes data transmissions with the assistance of a SD (e.g., a macro).

Operations 750 may begin with the SD assigning node/ device specific parameters to the first node/device, where the node/device specific parameters may be a specific sequence, a subframe opportunity, or a PRB opportunity associated with the first node (block 755). The assignment may be a semi-static assignment or a long term assignment. The second node may receive information about the node/device specific parameters associated with the first node (block 757). The second node may have received the node/device specific parameters from the SD or a network entity or the first node. The second node may transmit a signal indicating the node/device specific parameters associated with the first node and the first node may receive the signal (block 759). The first node may respond to the signal by transmitting a response (block 761). The first node may establish communications, such as device-to-device (D2D) communications, with the second node (block 763).

Figure 8A:
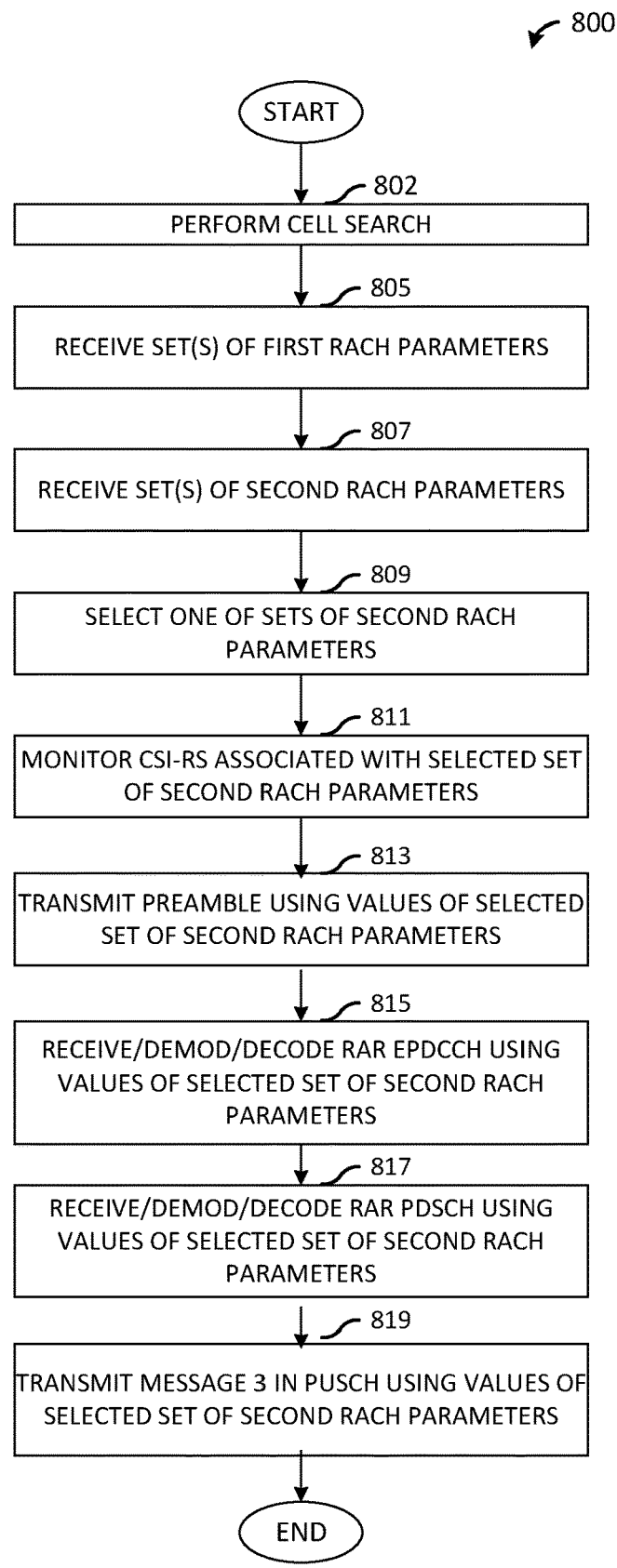
FIG. 8a illustrates an example flow diagram of operations occurring in a UE as the UE participates in a random access procedure according to example embodiments described herein.

FIG. 8a illustrates a flow diagram of operations 800 occurring in a UE as the UE participates in a random access procedure. Operations 800 may be indicative of operations occurring in a UE as the UE participates in a random access procedure with a NSD, where both the UE and the NSD are part of a communications system.

Operations 800 may begin with the UE performing a cell search procedure (block 802). The cell search procedure may involve the UE obtaining synchronization with one or more SDs in the communications system. As an illustrative example, the cell search procedure may include powering on (or waking up, resetting, and the like) in the coverage area of the communications system and searching for a primary synchronization signal (PSS) and a secondary synchronization signal (SSS). The cell search procedure also includes the UE measuring a common reference signal and detecting a physical broadcast channel (PBCH). The PSS, SSS, common reference signal, and PBCH may provide the UE with cell searching information, such as timing information, physical layer identity, physical layer cell identity, and the like. The cell search procedure may take place between the UE and one or more SDs.

The UE may receive a set(s) of first RACH parameters (block 805). Each of the set(s) of first RACH parameters may be associated with a group of identifiers or contain a group of identifiers. The groups of identifiers may include physical cell identifiers, virtual cell identifiers (VCIDs), or a combination thereof. As an example, an example set of first RACH parameters may include a cell identity, CSI-RS resources, DMRS, cell IDs, identifiers (e.g., VCIDs) used in CSI-RS, DMRS, and PUSCH, and the like. The example set of first RACH parameters may also include RACH preambles, RACH configuration indexes, RACH opportunities in time and/or frequency, and RACH power control parameters. The example set of first RACH parameters may also include linking information to identifiers, e.g., VCIDs, contained in a group of parameters and/or configurations. The set of first RACH parameters may be transmitted to the UE by a SD, an eNB, a network entity, and the like. The set(s) of first RACH parameters may include RACH parameters for devices, such as SDs, in the communications system. The UE may receive a set(s) of second RACH parameters (block 807). Each of the set(s) of second RACH parameters may be associated with a group of identifiers or contain a group of identifiers. The groups of identifiers may include physical cell identifiers, virtual cell identifiers (VCIDs), or a combination thereof. As an example, an example set of second RACH parameters may include a cell identity or a virtual cell identity, a PDCCH, a EPDCCH, a PUSCH, a RACH specific identifier for DMRS of PDCCH, a RACH specific identifier for DMRS of EPDCCH, a RACH specific identifier for DMRS of PDSCH, RACH specific identifier for DMRS of PUSCH, a CRS, a CSI-RS, and the like. The set(s) of second RACH parameters may be transmitted to the UE by a SD, an eNB, a network entity, and the like. The set(s) of second RACH parameters may include RACH parameters for devices, such as NSDs, in the communications system. The set of first RACH parameters and the set of second RACH parameters may be transmitted by different devices or the same device.

According to an example embodiment, the identifiers that are signaled to the UE may include at least one identifier that is not used in the random access procedure. As an example, some of the signaled parameters may be configured for the UE to perform UL and/or DL transmissions such CoMP, multi-user MIMO, and the like, Therefore, only a subset of the identifiers (or parameters) is used (or reused) for random access procedure purposes.

According to an example embodiment, the identifiers used for a random access procedure may be received from different network signaling or even from different devices. As an illustrative example, the identifiers to be used for demodulating and decoding a RAR may be sent from a first device (such as a macro eNB), while the identifiers to be used for Message 3 may be sent from a second device that is also transmitting the RAR. In general, the device transmitting the RAR may have the flexibility to assign identifiers to be used in the remainder of the random access procedure. It is noted that the example is intended for illustrative purposes and not intended to limit the scope or the spirit of the example embodiments.

The UE may select one of the sets of second RACH parameters (block 809). The UE may select one of the sets of second RACH parameters by selecting a group of identifiers to which it is associated. As an example, the UE may select an identifier by selecting a device associated with a group of identifiers in accordance with the device's signal strength, its available data bandwidth, its CoMP capabilities, its historic performance data, and the like. The UE may use values of the selected set of second RACH parameters to monitor for a CSI-RS (block 811). The use of the values of the selected set of second RACH parameters permits the UE to identify a CSI-RS as transmitted by the device. The UE may measure the signal strength of the CSI-RS as transmitted by the device and uses the measured signal strength to determine a pathloss for the device. The UE may transmit a RACH preamble to the device using the values in the selected set of second RACH parameters and/or the group of identifiers associated with the selected set of second RACH parameters (block 813). The RACH preamble may be transmitted with a transmit power level set in accordance with the pathloss for the device.

The UE may receive, demodulate, and decode a RAR from the device (or another device depending on the configuration) on a EPDCCH using values of the selected set of second RACH parameters and/or the group of identifiers associated with the selected set of second RACH parameters (block 815). As an example, the UE may use the RACH specific DMRS for EPDCCH for the NSD to receive, demodulate, and decode the RAR on the EPDCCH. The UE may receive, demodulate, and decode a RAR from the NSD (or another NSD depending on the configuration) on a PDSCH using the values of the selected set of second RACH parameters and/or the group of identifiers associated with the selected set of second RACH parameters (block 817). As an example, the UE may use the RACH specific DMRS for PDSCH for the NSD to receive, demodulate, and decode the RAR on the PDSCH. The UE may transmit a Message 3 to the NSD on a PUSCH (block 819). The UE may use the values of the selected set of second RACH parameters and/or the group of identifiers associated with the selected set of second RACH parameters in the transmission of the Message 3. As an example, the UE may use the RACH specific DMRS of PUSCH to transmit the Message 3.

Figure 8B:
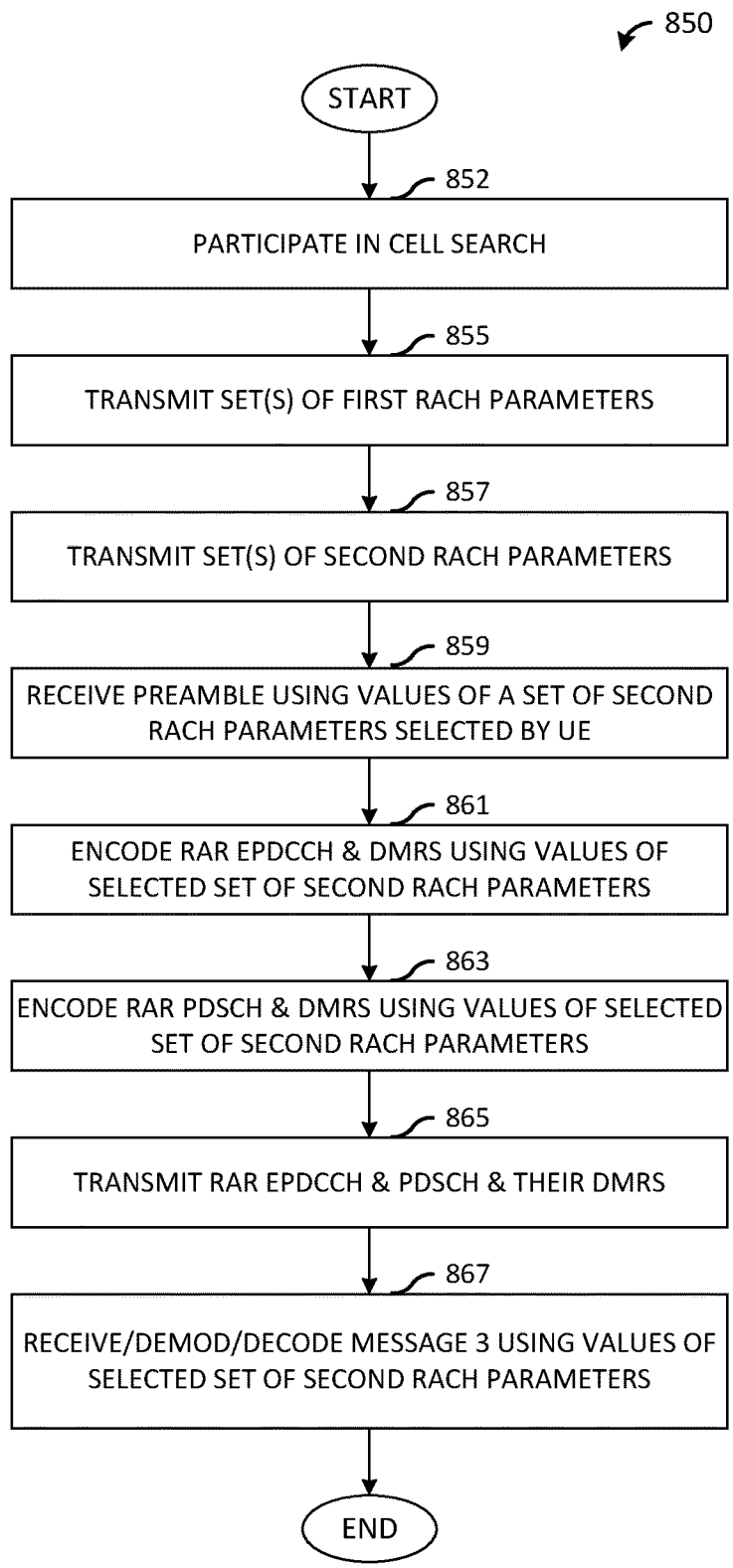
FIG. 8b illustrates an example flow diagram of operations occurring in a NSD as the NSD participates in a random access procedure according to example embodiments described herein.

FIG. 8b illustrates a flow diagram of operations 850 occurring in a device as the device participates in a random access procedure. Operations 850 may be indicative of operations occurring in a device, such as a NSD, as the device participates in a random access procedure with a UE, where both the UE and the device are part of a communications system.

Operations 850 may begin with the device participating in a cell search procedure (block 852). The device may help the UE obtain synchronization with the communications system. As an illustrative example, the device may transmit a PSS and a SS. The device may also transmit a common reference signal and a PBCH. The PSS, SSS, common reference signal, and PBCH may provide the UE with cell searching information, such as timing information, physical layer identity, physical layer cell identity, and the like.

The device may transmit a set(s) of first RACH parameters to the UE (block 855). The set(s) of first RACH parameters may include RACH parameters for devices, such as SDs, in the communications system. Each of the set(s) of first RACH parameters may be associated with a group of identifiers or contain a group of identifiers. The groups of identifiers may include physical cell identifiers, virtual cell identifiers (VCIDs), or a combination thereof. The device may transmit a set(s) of second RACH parameters to the UE (block 857). The set(s) of second RACH parameters may include RACH parameters for devices, such as NSDs, in the communications system. Each of the set(s) of second RACH parameters may be associated with a group of identifiers or contain a group of identifiers. The groups of identifiers may include physical cell identifiers, virtual cell identifiers (VCIDs), or a combination thereof. It is noted that although shown in FIG. 8b as both the set(s) of first RACH parameters and the set(s) of second RACH parameters being transmitted by the device, different sources of the set(s) of first RACH parameters and the set(s) of second RACH parameters may be possible. As an example, another device, such as a SD, may transmit the set(s) of first RACH parameters and the device may transmit the set(s) of second RACH parameters. As another example, another device, such as a SD, may transmit both the set(s) of first RACH parameters and the set(s) of second RACH parameters. As another example, another device, such as a NSD, may transmit one or both of the set(s) of first RACH parameters and the set(s) of second RACH parameters.

The device may receive a RACH preamble using values of one of the sets of second RACH parameters associated with a group of identifiers one of which corresponds to the device (the set of second RACH parameters may be selected by the UE) (block 859). Since the set of second RACH parameters as selected by the UE is associated with the device, the device already knows which second RACH parameters to look for in received transmissions. The device may encode a RAR EPDCCH using a RACH specific DMRS for EPDCCH in accordance with the set of second RACH parameters and/or the group of identifiers associated with the set of second RACH parameters (block 861). The device may encode a RAR PDSCH using a RACH specific DMRS for PDSCH in accordance with the set of second RACH parameters and/or the group of identifiers associated with the set of second RACH parameters (block 863). The NSD may transmit the RAR EPDCCH and the RAR PDSCH and their respective RACH specific DMRS to the UE (block 865). The NSD may receive and decode a Message 3 transmitted by the UE in accordance with the set of second RACH parameters and/or the group of identifiers associated with the set of second RACH parameters (block 867). The receipt and decoding of the Message 3 may initiate communications between the NSD and the UE.

Figure 9A:
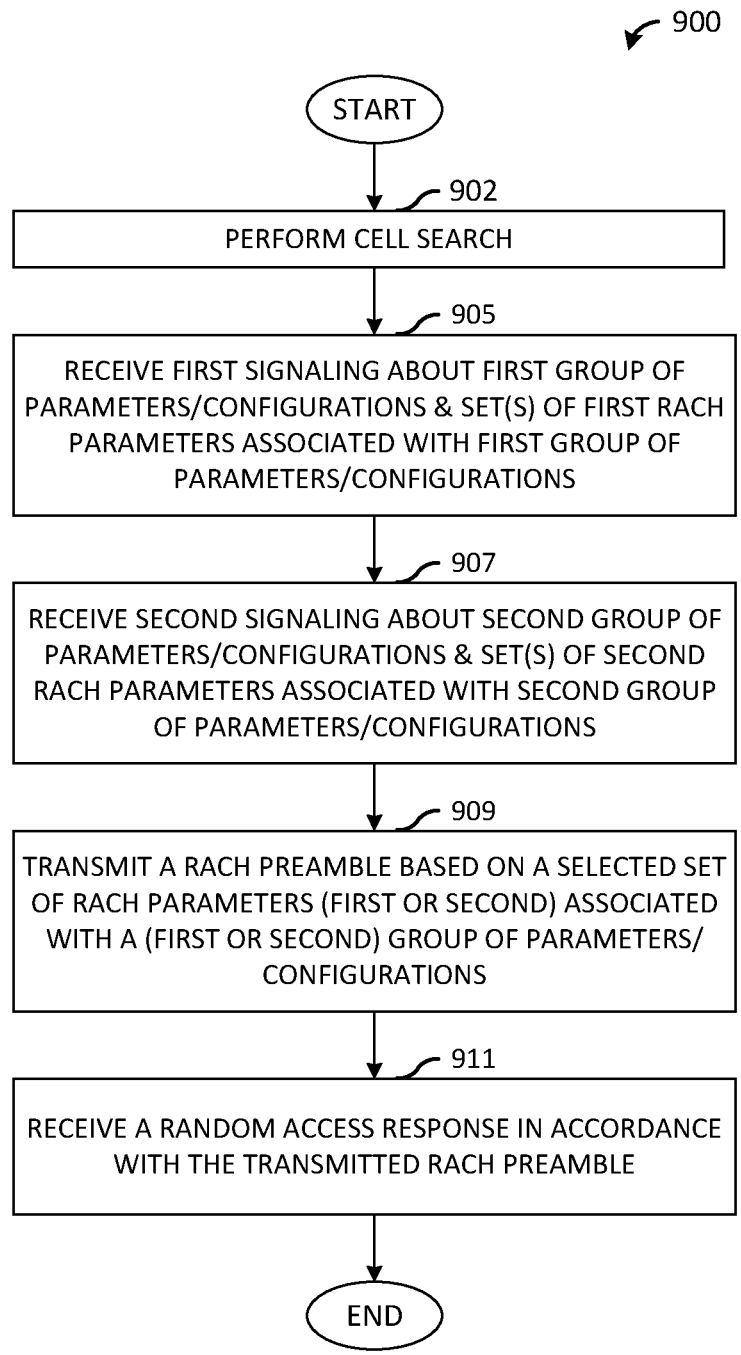
FIG. 9a illustrates an example flow diagram of operations occurring in a UE participating in a configurable random access procedure with a SD or a NSD according to example embodiments described herein.

FIG. 9a illustrates a flow diagram of operations 900 occurring in a UE participating in a configurable random access procedure with a SD or a NSD. Operations 900 may be indicative of operations occurring in a UE as the UE participates in a configurable random access procedure with a SD or a NSD in a virtual cell scenario.

Operations 900 may begin with the UE performing a cell search procedure (block 902). The cell search procedure may involve the UE obtaining synchronization with one or more SDs in the communications system. As an illustrative example, the cell search procedure may include powering on (or waking up, resetting, and the like) in the coverage area of the communications system and searching for a PSS and a SSS. The cell search procedure also includes the UE measuring a common reference signal and detecting a PBCH. The PSS, SSS, common reference signal, and PBCH may provide the UE with cell searching information, such as timing information, physical layer identity, physical layer cell identity, and the like. The cell search procedure may take place between the UE and one or more SDs.

The UE may receive a first signaling that includes a first group of parameters and/or configurations and set(s) of first RACH parameters associated with the first group of parameters and/or configurations (block 905). The first group of parameters and/or configurations comprises parameters for a cell (such as a SD) and may include identifiers (such as cell identifiers (e.g., PCID) and/or virtual cell identifiers (e.g., VCID)), one or more CSI-RS identifiers and their configurations (e.g., periodicity, time-frequency resource locations, and the like), one or more CSI interference measurement resource (CSI-IMR) configurations, one or more EPDCCH identifiers, one or more PDSCH identifiers, one or more DMRS identifiers, and the like. The set(s) of first RACH parameters may include one or more RACH parameter sets, with each RACH parameter set including RACH preambles, PRACH configuration indices, power control parameters, and the like. The set(s) of RACH parameters may include links to identifiers (e.g., VCIDs) or even the identifiers (e.g., the VCIDs). As an illustrative example, one set of first RACH parameters may include values and/or settings to allow the UE to perform a random access procedure with a first cell, another set of first RACH parameters may include values and/or settings to allow the UE to perform a random access procedure with a remote antenna of the first cell, and the like. In general, it may be considered that a set of first RACH parameters includes values and/or settings to allow the UE to perform a random access procedure with antennas of a cell that are connected via a fast backhaul. However, it is possible to have a set of first RACH parameters that includes values and/or settings that allow the UE to perform random access procedures with antennas that are connected via any backhaul, or a subset of antennas that are connected via a fast backhaul, and the like. The signaling may also provide the UE with information about associations between the first group of parameters and actual cells so that the UE will know which identifiers are to be used with which set(s) of first RACH parameters.

The UE may receive a second signaling that includes a second group of parameters and/or configurations and set(s) of second RACH parameters associated with the second group of parameters and/or configurations (block 907). The second group of parameters and/or configurations and the set(s) of second RACH parameters may be similar to the first group of parameters and/or configurations and the set(s) of second RACH parameters. According to an example embodiment, the first group of parameters and/or configurations and the set(s) of second RACH parameters may specify information regarding devices, such as SDs, while the second group of parameters and/or configurations and the set(s) of second RACH parameters may specify information regarding devices, such as NSDs.

For discussion purposes, consider a situation wherein the UE selects a set of RACH parameters (either from the set(s) of first RACH parameters or the set(s) of second RACH parameters) associated with either the first group of parameters and/or configurations or the second group of parameters and/or configurations. The selection may be based on one or more factors, including: pathloss, signal strength, data bandwidth availability, data bandwidth requirements, latency, error rate, and the like. Alternatively, the UE may receive signaling that specifies with set of RACH parameters to use. The UE may transmit a RACH preamble with the transmission being in accordance with the selected set of RACH parameters and/or the associated first or second group of parameters and/or configurations (block 909). The UE may receive a RAR in accordance with the RACH preamble and the selected set of RACH parameters and/or the associated first or second group of parameters and/or configurations (block 911).

According to an example embodiment, the first signaling may include one or more TAG configurations. Associations between the one or more TAG configurations and the set(s) of of first RACH parameters may also be specified. Similarly, the second signaling may also include one or more TAG configurations and associations between the one or more TAG configurations and the set(s) of second RACH parameters. Generally, at least one set of RACH parameters (first and/or second) should be associated with a TAG. The association may be used if the nodes are connected via any backhaul and/or having different timings According to another example embodiment, neither the first signaling nor the second signaling includes any TAG information. Instead, another signaling is sent to the UE to configure the UE to use a timing advance for all sets of RACH parameters (first and/or second). This may be used if all the corresponding nodes are in one TAG.

According to another example embodiment, a set of RACH parameters (e.g. a set of second RACH parameters) may also include its association with some parameters and/or channels. As an example, the parameters and/or channels include CSI-RS resources, DMRS, cell-IDs, VCIDs used in CSI-RS/DMRS/PUSCH, and the like. The set of RACH parameters may also include RACH preambles, RACH configuration indexes, RACH transmission opportunities in time and/or frequency, and RACH power control parameters. The UE may determine necessary configurations when it decides to perform a random access procedure with a specific node.

According to another example embodiment, a group of network resources is configured for a UE, and there may be one or more sets of RACH parameters configured per group of network resources. The group of parameters (first and/or second) may also include one or more of a collection of CSI-RS resources, a collection of DMRS resources, a collection of power control parameters, and a UEID. The collections form a group of resources that some group-specific parameters and operations can be used. Group specific RACH or group specific RACHs (which needs to further associations between the RACHs and group resources) can be supported. In other words, the grouping method and the multiple RACH method may be combined. Refer to U.S. Provisional Application No. 61/676,643, filed on Jul. 27, 2012, entitled "A multiple point communication method and system," which is incorporated herein by reference, for details of the grouping method. In general, in group based operations, the network may configure a set of first communications system resources to form a plurality of first communications system resource groups, with each first communications system resource group including a plurality of channels, and a set of second communications system resources to form a plurality of first communications system resource groups, with each second communications system resource group including a plurality of channels. The different sets of first communications system resources may be configured in accordance with a characteristic of a backhaul connection between one or more cells. As an example, cells associated with the first communications system resource groups are connected via fast backhaul, and cells associated with the second communications system resource groups are connected via fast backhaul, but between them there may not be fast backhaul. Different groups are associated with different RACH settings, and one group may be associated with one or more RACH settings to support group based operations.

Configuring one or more sets of RACH parameters per group of resources is generally for an any backhaul scenario. For each group of resources, there may be a timing advance process. Each timing advance process may include one or more messages in a MAC entity to indicate one or more timing advances respectively for one or more uplink link(s). If two groups of resources are connected via any backhaul, separate timing advance processes may be used. Multiple time advance processes may mean that multiple sets of RACH parameters are necessary. Hence, sets of RACH parameters are configured per group of resources, where each group of resources may have a separate timing advance process. Depending on one or more uplink timing, for each group of resources there may be one or more sets of RACH parameters. Example embodiments relate to network equipment signaling the UE to configure a group of resources as well as the sets of RACH parameters associated with the group of resources. Additionally, example embodiments relates to the UE receiving the signaling and transmitting the RACH preamble in accordance with information included in the signaling.

Figure 9B:
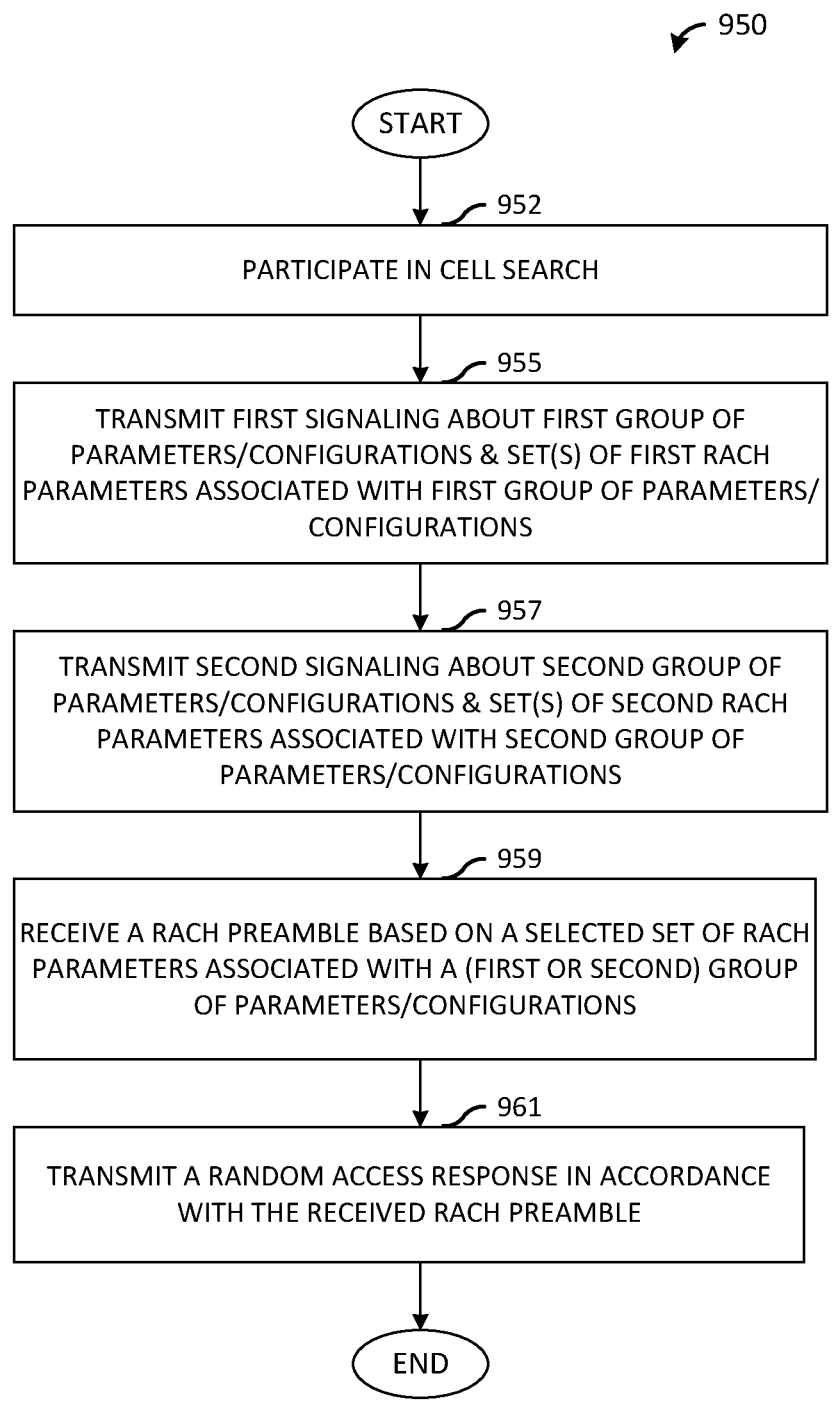
FIG. 9b illustrates an example flow diagram of operations occurring in a NSD participating in a configurable random access procedure with a UE according to example embodiments described herein.

FIG. 9b illustrates a flow diagram of operations 950 occurring in a device participating in a configurable random access procedure with a UE. Operations 950 may be indicative of operations occurring in a device, such as a NSD, as the device participates in a configurable random access procedure with a UE in a virtual cell scenario.

Operations 950 may begin with the device participating in a cell search procedure (block 952). The device may help the UE obtain synchronization with the communications system. As an illustrative example, the device may transmit a PSS and a SS. The device may also transmit a common reference signal and a PBCH. The PSS, SSS, common reference signal, and PBCH may provide the UE with cell searching information, such as timing information, physical layer identity, physical layer cell identity, and the like.

The device may transmit a first signaling that includes a first group of parameters and/or configurations and set(s) of first RACH parameters associated with the first group of parameters and/or configurations (block 955). The first group of parameters and/or configurations comprises parameters for a cell (such as a SD) and may include identifiers (such as cell identifiers (e.g., PCID) and/or virtual cell identifiers (e.g., VCID)), one or more CSI-RS identifiers and their configurations (e.g., periodicity, time-frequency resource locations, and the like), one or more CSI interference measurement resource (CSI-IMR) configurations, one or more EPDCCH identifiers, one or more PDSCH identifiers, one or more DMRS identifiers, and the like. The device may transmit a second signaling that includes a second group of parameters and/or configurations and set(s) of second RACH parameters associated with the second group of parameters and/or configurations (block 957). The second group of parameters and/or configurations and the set(s) of second RACH parameters may be similar to the first group of parameters and/or configurations and the set(s) of second RACH parameters. Although operations 950 illustrate the device transmitting both the first signaling and the second signaling, other example embodiments may have the device transmitting only the first signaling, only the second signaling, or neither the first signaling nor the second signaling. As an illustrative example, the first signaling may be signaled by a macro to configure for a group of nodes connected to the macro with fast backhaul, and the second signaling may be signaled by a pico to configure for a group of nodes connected to the pico with fast backhaul. The device may receive a RACH preamble transmitted by the UE, the RACH preamble is received in accordance with values of one of the sets of RACH parameters associated with a group of identifiers one of which corresponds to the device (the set of second RACH parameters may be selected by the UE) (block 959). The device may transmit a RAR in accordance with the RACH preamble and the values of the set of RACH parameters and/or the group of identifiers associated with the set of second RACH parameters (block 961). According to an alternative example embodiment, a first node may receive the RACH preamble transmitted by the UE and a second node may transmit the RAR to the UE, where the second node may be connected to the first node via a fast backhaul.

The device based RACH operations may be generalized to be used for standalone new carrier type (S-NCT). With S-NCT, a device (e.g., a cell) may establish a connection with a UE without assistance from a legacy SD, and the device does not have one or more of the PCID, CRS, and PDCCH. UE and the device may exchange messages and complete the initial access procedure based on information broadcast by the device. The broadcast information may contain information to allow the UE to perform the random access procedure with the device, including information about a RS used to estimate the pathloss for RACH power, information about RAR detection and/or decoding parameters, information about Message 3 scrambling parameters, corresponding RACH parameters (e.g. preambles, time-frequency resources, power offset, and the like), all of which may be associated with the device.

Figure 10:
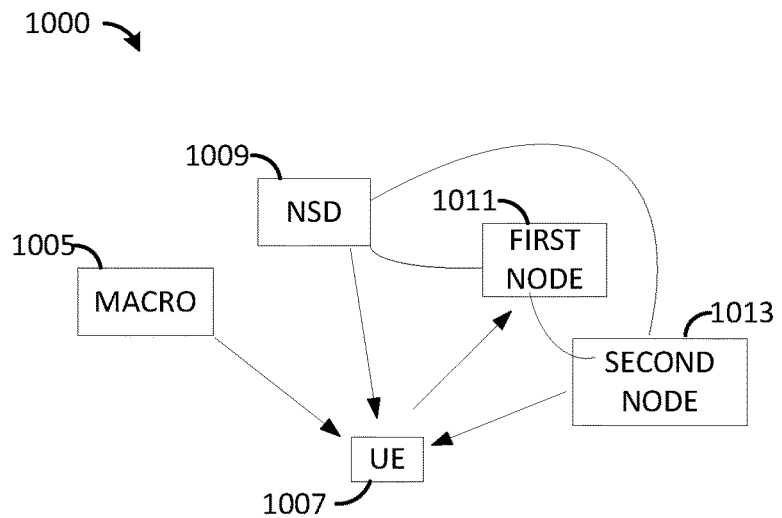
FIG. 10 illustrates an example communications system highlighting a virtual cell scenario performing message exchanges as shown in FIG. 9b according to example embodiments described herein.

FIG. 10 illustrates a communications system 1000 highlighting a virtual cell scenario performing message exchanges as shown in FIG. 9b. Communications system 1000 includes a macro 1005 serving a UE 1007. Macro 1005 transmits a first signaling to UE 1007. Communications system 1000 also includes a NSD 1009 that transmits a second signaling to UE 1007. UE 1007 transmits a RACH preamble that is received by first node 1011 and second node 1013 transmits a RAR to UE 1007. NSD 1009, first node 1011, and second node 1013 may be connected via a fast backhaul.

Figure 11:
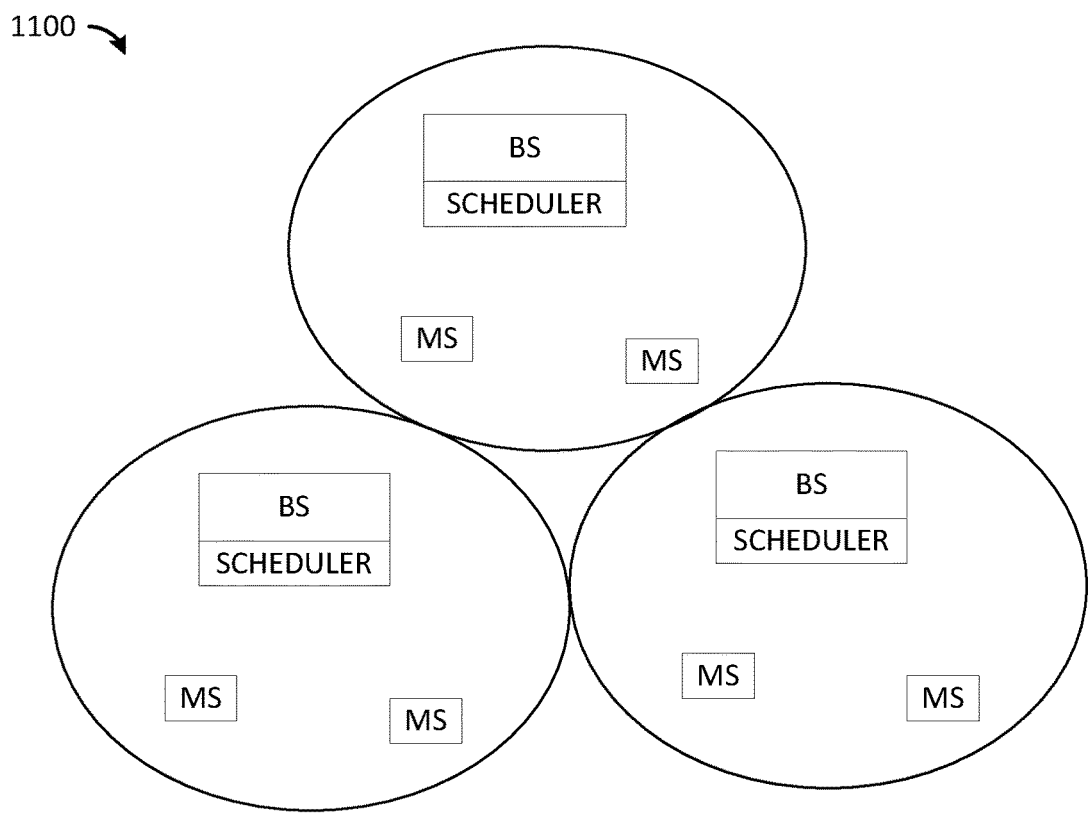
FIG. 11 illustrates an example wireless communications network which preferably comprises a plurality of base stations (BS) providing voice and/or data wireless communication service to a plurality of mobile stations (MSs) according to example embodiments described herein.

FIG. 11 illustrates a wireless communications network 1100 which preferably comprises a plurality of base stations (BS) providing voice and/or data wireless communication service to a plurality of mobile stations (MSs). The BSs, which may also be referred to by other names such as access network (AN), access point (AP), Node-B, and the like, preferably downlink (DL) information to the MSs while also receiving uplink (UL) information from the MSs.

Each BS preferably has a corresponding coverage area. These coverage areas represent the range of each BS to adequately transmit data, and, while not necessarily shown, the coverage areas of adjacent BSs preferably have some overlap in order to accommodate handoffs between BSs whenever a MS exits one coverage area and enters an adjacent coverage area. Each BS also preferably includes a scheduler for allocating radio resources to the MSs.

Figure 12:
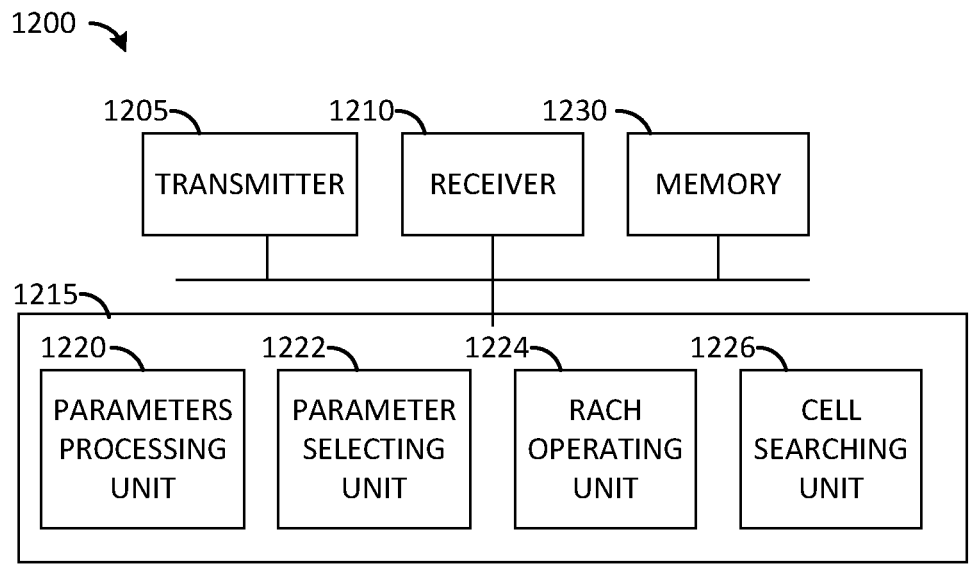
FIG. 12 illustrates an example first communications device according to example embodiments described herein.

FIG. 12 illustrates a first communications device 1200. Communications device 1200 may be an implementation of a UE, a mobile, a mobile station, a terminal, a user, a subscriber, and the like. Communications device 1200 may be used to implement various ones of the embodiments discussed herein. As shown in FIG. 12, a transmitter 1205 is configured to transmit packets, RACH preambles, Message 3s, and the like. Communications device 1200 also includes a receiver 1210 that is configured to receive packets, sets of RACH parameters, groups of parameters, RARs, and the like.

A parameters processing unit 1220 is configured to process received parameters, including groups of parameters and/or configurations (such as groups of identifiers), sets of RACH parameters, and the like, to determine associations, assignments, and the like. A parameter selecting unit 1222 is configured to select a set of parameters, such as a set of RACH parameters, for communications device 1200 to use to perform a random access procedure. Parameter selecting unit 1222 is configured to select a set of parameters in accordance with one or more of the following: pathloss, signal strength, data bandwidth availability, data bandwidth requirements, latency, error rate, and the like. Parameter selecting unit 1222 is configured to select a set of parameters in accordance with a received instruction. A RACH operating unit 1224 is configured to perform operations involved in a random access procedure, including generate and transmit a RACH preamble, processing a received RAR, generate and transmit a Message 3, and the like. A cell search unit 1226 is configured to search for cells in the communications system to synchronize communications device 1200. A memory 1230 is configured to store data, groups of parameters, sets of RACH parameters, pathloss, cell search information, and the like.

The elements of communications device 1200 may be implemented as specific hardware logic blocks. In an alternative, the elements of communications device 1200 may be implemented as software executing in a processor, controller, application specific integrated circuit, or so on. In yet another alternative, the elements of communications device 1200 may be implemented as a combination of software and/or hardware.

As an example, receiver 1210 and transmitter 1205 may be implemented as a specific hardware block, while parameters processing unit 1220, parameters selecting unit 1222, RACH operating unit 1224, and cell searching unit 1226 may be software modules executing in a microprocessor (such as processor 1215) or a custom circuit or a custom compiled logic array of a field programmable logic array. Parameters processing unit 1220, parameters selecting unit 1222, RACH operating unit 1224, and cell searching unit 1226 may be modules stored in memory 1230.

Figure 13:
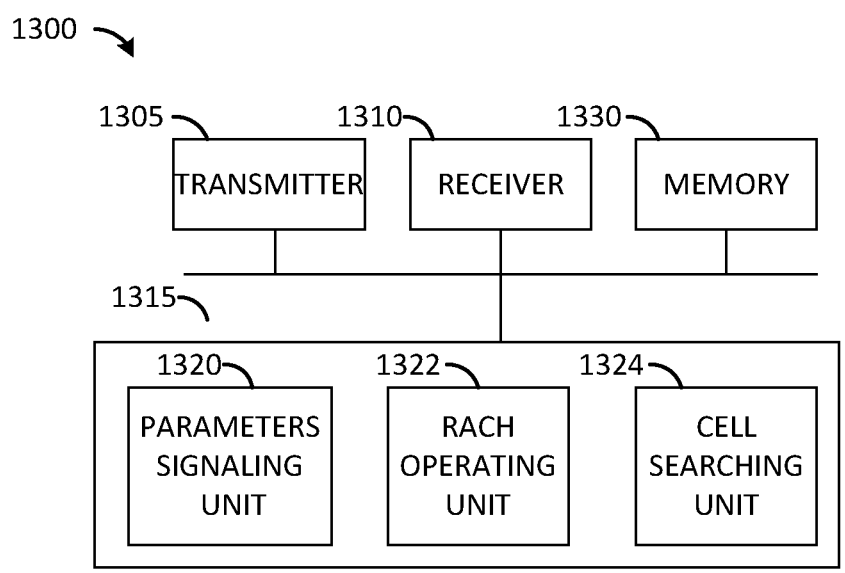
FIG. 13 illustrates an example second communications device according to example embodiments described herein.

FIG. 13 illustrates a second communications device 1300. Communications device 1300 may be an implementation of a SD, such as a macro, a pico, and the like, or a NSD, such as a pico, a LPN, a femtocell, and the like. Communications device 1300 may be used to implement various ones of the embodiments discussed herein. As shown in FIG. 13, a transmitter 1305 is configured to transmit packets, sets of RACH parameters, groups of parameters, RARs, and the like. Communications device 1200 also includes a receiver 1210 that is configured to receive packets, RACH preambles, Message 3s, and the like.

A parameters signaling unit 1320 is configured to signal parameters, including groups of parameters and/or configurations (such as groups of identifiers), sets of RACH parameters, and the like, to UEs. A RACH operating unit 1322 is configured to perform operations involved in a random access procedure, including receive and process a received RACH preamble, generate and transmit a RAR, receive and process a Message 3, and the like. A cell searching unit 1324 is configured to transmit signals and channels to help UEs perform cell searching procedures. A memory 1330 is configured to store data, groups of parameters, sets of RACH parameters, RACH preambles, Message 3s, cell searching information, and the like.

The elements of communications device 1300 may be implemented as specific hardware logic blocks. In an alternative, the elements of communications device 1300 may be implemented as software executing in a processor, controller, application specific integrated circuit, or so on. In yet another alternative, the elements of communications device 1300 may be implemented as a combination of software and/or hardware.

As an example, receiver 1310 and transmitter 1305 may be implemented as a specific hardware block, while parameters signaling unit 1320, RACH operating unit 1322, and cell searching unit 1324 may be software modules executing in a microprocessor (such as processor 1315) or a custom circuit or a custom compiled logic array of a field programmable logic array. Parameters signaling unit 1320, RACH operating unit 1322, and cell searching unit 1324 may be modules stored in memory 1330.

Although the present disclosure and its advantages have been described in detail, it should be understood that various changes, substitutions and alterations can be made herein without departing from the spirit and scope of the disclosure as defined by the appended claims.

What is claimed is:

1. A method performed by a user equipment (UE), the method comprising:
receiving, by the UE, a random access channel (RACH) parameter configuration comprising a first set of RACH parameters associated with one or more channel state information reference signal (CSI-RS) resources, the first set of RACH parameters comprising a first RACH preamble set comprising a plurality of RACH preambles and CSI-RS identifiers;
configuring an association between the first RACH preamble set and CSI-RS resources in accordance with the first RACH preamble set and the CSI-RS identifiers;
monitoring, by the UE, a CSI-RS;
selecting, by the UE in accordance with the CSI-RS and the association between the first RACH preamble set and CSI-RS resources, a first RACH preamble from the first set of RACH parameters associated with the one or more CSI-RS resources and comprising-the first RACH preamble set;
transmitting, by the UE, the first RACH preamble;
demodulating and decoding a control channel of a RACH response (RAR) in accordance with a first identifier of a network entity and a second identifier of demodulation reference signal (DMRS) for the RAR control channel;
demodulating and decoding a data channel indicated by the decoded control channel in accordance with a third identifier of the data channel and a fourth identifier of DMRS for the data channel; and
transmitting a message in a resource allocation indicated by the decoded data channel, with data scrambled and encoded with a fifth identifier of a physical uplink shared channel (PUSCH) and with reference signals modulated with a sixth identifier of DMRS for the PUSCH.

2. The method of claim 1, further comprising: determining, by the UE, a RACH transmission opportunity corresponding to the CSI-RS in accordance with an association between RACH transmission opportunities and the one or more CSI-RS resources.

3. The method of claim 1, wherein monitoring the CSI-RS comprises measuring a pathloss estimation or a signal strength of CSI-RSs.

4. The method of claim 1, the RACH parameter configuration comprising a second set of RACH parameters, the second set of RACH parameters being associated with second type of resources different from CSI-RS resources and comprising a second RACH preamble set; the method further comprising:
measuring, by the UE, one or more second signal measurements of second type of signals on the second type of resources; and
selecting, by the UE based on the one or more second signal measurements, a second RACH preamble from the second RACH preamble set.

5. A user equipment (UE) comprising:
a receiver configured to receive a random access channel (RACH) parameter configuration comprising a first set of RACH parameters associated with one or more channel state information reference signal (CSI-RS) resources, the first set of RACH parameters comprising a first RACH preamble set comprising a plurality of RACH preambles and CSI-RS identifiers;
memory configured to store instructions;
a processor operatively coupled to the receiver and to the memory, the processor being configured, upon execution of the instructions, to cause the UE to:
configure an association between the first RACH preamble set and CSI-RS resources in accordance with the first RACH preamble set and the CSI-RS identifiers;
monitor a CSI-RS;
select, in accordance with the CSI-RS and the association between the first RACH preamble set, a first RACH preamble from the first set of RACH parameters associated with the one or more CSI-RS resources and comprising the first RACH preamble set; and transmit the first RACH preamble;
demodulate and decode a control channel of a RACH response (RAR) in accordance with a first identifier of a network entity and a second identifier of demodulation reference signal (DMRS) for the RAR control channel;
demodulate and decode a data channel indicated by the decoded control channel in accordance with a third identifier of the data channel and a fourth identifier of DMRS for the data channel; and
transmit a message in a resource allocation indicated by the decoded data channel, with data scrambled and encoded with a fifth identifier of a physical uplink shared channel (PUSCH) and with reference signals modulated with a sixth identifier of DMRS for the PUSCH.

6. The UE of claim 5, the instructions, upon execution by the processor, further causing the UE to determine a RACH transmission opportunity corresponding to the selected CSI-RS in accordance with an association between RACH transmission opportunities and the one or more CSI-RS resources.

7. The UE of claim 5, the CSI-RS being selected based on a pathloss estimation or a signal strength of received CSI-RSs.

8. The UE of claim 5, the RACH parameter configuration comprising a second set of RACH parameters, the second set of RACH parameters being associated with second type of resources different from CSI-RS resources and comprising a second RACH preamble set;
the instructions, upon execution by the processor, further causing the UE to:
measure one or more second signal measurements of second type of signals on the second type of resources; and
select a second RACH preamble from the second RACH preamble set in accordance with the one or more second signal measurements.

9. A user equipment (UE) comprising:
a memory storage comprising instructions; and
one or more processors in communication with the memory, wherein the one or more processors execute the instructions that cause the UE to:
configure the UE with an association between a set of random access channel (RACH) preambles and channel state information reference signal (CSI-RS) resources in accordance with a received first RACH preamble set comprising a plurality of RACH preambles and CSI-RS identifiers;
monitor a CSI-RS;
transmit a first RACH preamble in accordance with the CSI-RS and the association between the set of RACH preambles and the CSI-RS resources;
demodulate and decode a control channel of a RACH response (RAR) in accordance with a first identifier of a network entity and a second identifier of demodulation reference signal (DMRS) for the RAR control channel;
demodulate and decode a data channel indicated by the decoded control channel in accordance with a third identifier of the data channel and a fourth identifier of DMRS for the data channel; and
transmit a message in a resource allocation indicated by the decoded data channel, with data scrambled and encoded with a fifth identifier of a physical uplink shared channel (PUSCH) and with reference signals modulated with a sixth identifier of DMRS for the PUSCH.

10. The UE of claim 9, wherein the one or more processors execute instructions to: perform power control for the first RACH preamble based on a pathloss estimation of the CSI-RS.

11. The UE of claim 9, wherein the one or more processors further execute instructions that cause the UE to determine a RACH transmission opportunity corresponding to the CSI-RS in accordance with an association between a RACH transmission opportunity and the CSI-RS resources.

\* \* \* \* \*